(12) United States Patent
Ooba et al.

(10) Patent No.: US 8,937,431 B2
(45) Date of Patent: *Jan. 20, 2015

(54) SUB HEADLIGHT UNIT AND SUB HEADLIGHT SYSTEM FOR USE IN VEHICLE THAT LEANS INTO TURNS, AND VEHICLE THAT LEANS INTO TURNS

(71) Applicant: Yamaha Hatsudoki Kabushiki Kaisha, Iwata-shi, Shizuoka (JP)

(72) Inventors: Junichi Ooba, Shizuoka (JP); Takeshi Ikeda, Shizuoka (JP); Yasuhiko Kino, Shizuoka (JP); Makoto Kosugi, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 119 days.

This patent is subject to a terminal disclaimer.

(21) Appl. No.: 13/772,598

(22) Filed: Feb. 21, 2013

(65) Prior Publication Data

US 2013/0241412 A1    Sep. 19, 2013

(30) Foreign Application Priority Data

Mar. 19, 2012 (JP) ................. 2012-062378

(51) Int. Cl.
*B60Q 1/02* (2006.01)
*B60Q 1/04* (2006.01)
(Continued)

(52) U.S. Cl.
CPC .. *B60Q 1/04* (2013.01); *B60Q 1/12* (2013.01); *B60Q 1/18* (2013.01); *B62J 6/02* (2013.01); *B60Q 2300/136* (2013.01)
USPC ............................................ 315/82; 362/545

(58) Field of Classification Search
USPC ............................................ 315/82; 362/545
See application file for complete search history.

(56) References Cited

U.S. PATENT DOCUMENTS 2,516,052 A * 7/1950 Farr .............................. 362/529
7,477,976 B2 * 1/2009 Horii et al. ..................... 701/49
(Continued)

FOREIGN PATENT DOCUMENTS

| JP | 2009-120057 A | 6/2009 |
| JP | 2010-018120 A | 1/2010 |
| JP | 4864562 B2 | 2/2012 |

OTHER PUBLICATIONS

Ooba et al., "Sub Headlight Unit and Sub Headlight System for Use in Vehicle That Leans Into Turns, and Vehicle That Leans Into Turns", U.S. Appl. No. 13/772,607, filed Feb. 21, 2013.
(Continued)

*Primary Examiner* — Douglas W Owens
*Assistant Examiner* — Srinivas Sathiraju
(74) *Attorney, Agent, or Firm* — Keating & Bennett, LLP

(57) ABSTRACT

A sub headlight unit for use in a vehicle that leans into turns includes a plurality of sub headlight light sources to illuminate, at one side with respect to a width direction of the vehicle, an area ahead and outward of the vehicle with respect to the width direction of the vehicle. The brightness of the sub headlight light source changes in accordance with a lean angle of the vehicle. When the lean angle of the vehicle reaches a reference value that is individually set for each of the sub headlight light sources, the sub headlight light source exhibits a predetermined brightness. The reference values are greater than 0° and different from one another. The reference values are set to be values sequentially increasing at intervals from 0° such that the interval is smaller as the reference value is greater.

10 Claims, 18 Drawing Sheets

(51) Int. Cl.
  *B60Q 1/12* (2006.01)
  *B60Q 1/18* (2006.01)
  *B62J 6/02* (2006.01)

(56) References Cited

U.S. PATENT DOCUMENTS

| | | | |
|---|---|---|---|
| 7,860,627 B2 * | 12/2010 | Horii et al. | 701/49 |
| 7,988,226 B2 * | 8/2011 | Hirukawa | 296/198 |
| 7,988,345 B2 * | 8/2011 | Rosenhahn et al. | 362/538 |
| 8,251,560 B2 * | 8/2012 | Ohno et al. | 362/545 |
| 2005/0185413 A1 | 8/2005 | Martoch et al. | |
| 2013/0241412 A1 * | 9/2013 | Ooba et al. | 315/82 |
| 2013/0241413 A1 * | 9/2013 | Ooba et al. | 315/82 |
| 2013/0241414 A1 * | 9/2013 | Ikeda et al. | 315/82 |

OTHER PUBLICATIONS

Ikeda et al., "Sub Headlight Unit and Sub Headlight System for Use in Vehicle That Leans Into Turns, and Vehicle That Leans Into Turns", U.S. Appl. No. 13/772,618, filed Feb. 21, 2013.

Official Communication issued in corresponding European Patent Application No. 13159693.4, mailed on Nov. 26, 2013.

* cited by examiner

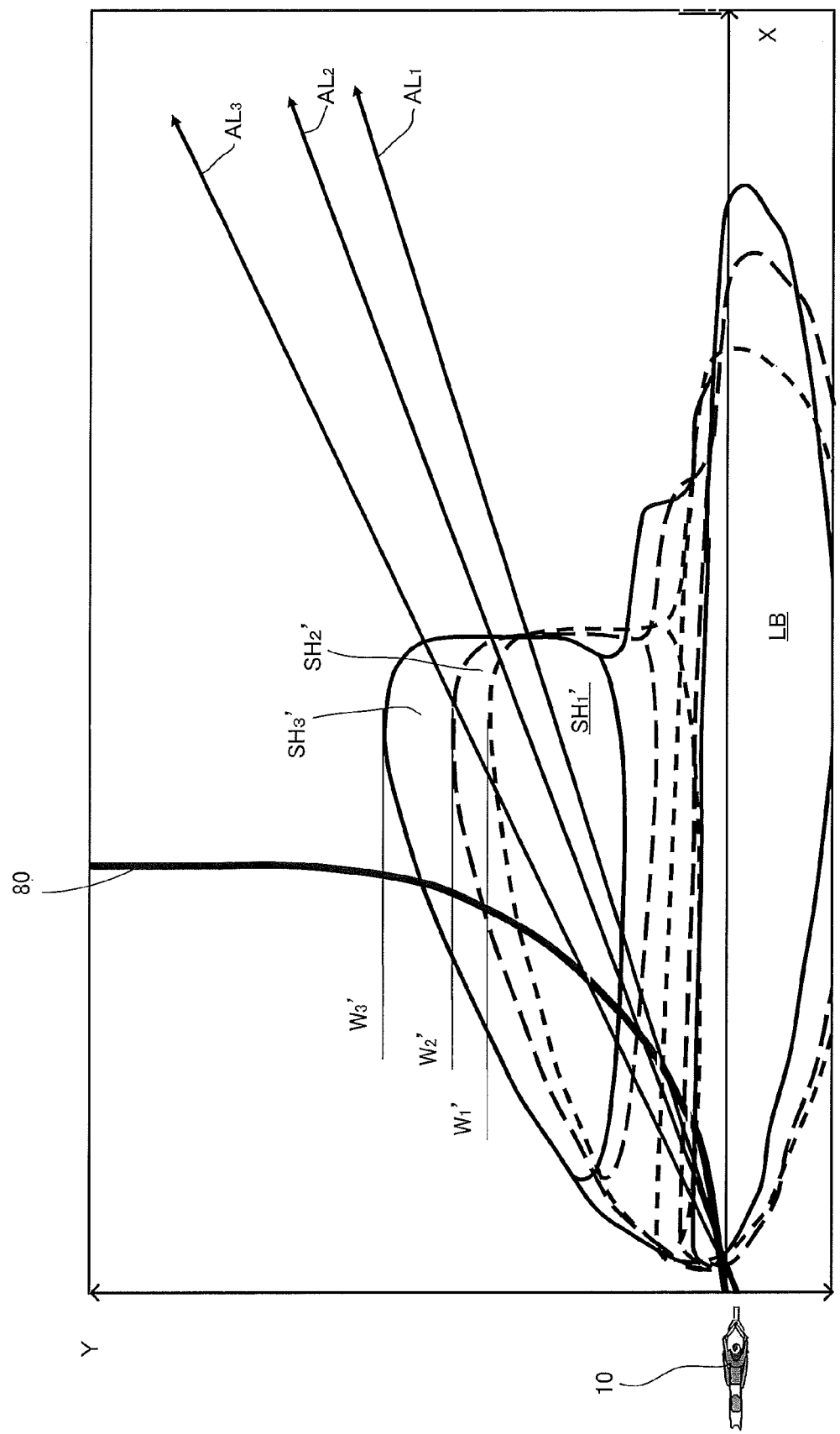

SUB HEADLIGHT UNIT AND SUB HEADLIGHT SYSTEM FOR USE IN VEHICLE THAT LEANS INTO TURNS, AND VEHICLE THAT LEANS INTO TURNS

BACKGROUND OF THE INVENTION

1. Field of the Invention

The present invention relates to a sub headlight unit and a sub headlight system for use in a vehicle that leans into turns, and a vehicle that leans into turns.

2. Description of the Related Art

In general, in a vehicle that leans into turns (such as saddle-ride type vehicles including motorcycles, three-wheeled motor vehicles, snowmobiles, and ATVs (all terrain vehicles), for example), when the vehicle corners or turns at an intersection, a rider operates a handlebar and additionally shifts his/her own weight in order to counteract centrifugal force acting on a vehicle body. Thereby, the vehicle turns with an attitude (hereinafter, also referred to as "lean attitude") leaning to the inner side of a curve. On the other hand, in a vehicle that does not lean into turns, for example, in an automobile, when the vehicle corners or turns at an intersection, a rider operates a steering wheel and turns with centrifugal force acting on a vehicle body. Therefore, in the vehicle that does not lean into turns, the vehicle body leans to the outer side of a curve due to the centrifugal force.

In the vehicle that leans into turns, the turning is performed with an active use of weight shifting of the rider himself/herself. Therefore, the vehicle body largely leans. In the vehicle that does not lean into turns, the vehicle body leans to the outer side of the curve due to the centrifugal force. The degree of this leaning varies depending on the running speed of the vehicle and the magnitude (radius) of the curve, and this leaning of the vehicle body is not utilized to perform turning. In the vehicle that does not lean into turns, it is preferable that the amount of leaning to the outer side of the curve due to the centrifugal force is small.

Thus, at a time of cornering or turning at an intersection, the vehicle that leans into turns causes the vehicle body to lean to the inner side of the curve with a relatively large amount of leaning, while the vehicle that does not lean into turns causes the vehicle body to lean to the outer side of the curve with a relatively small amount of leaning.

Normally, a vehicle is provided with a plurality of lights irrespective of whether or not the vehicle leans into turns. The lights include a light intended mainly to ensure a field of view of a rider of the vehicle and a light intended mainly to allow a surrounding vehicle or the like to recognize the presence of the rider's own vehicle. A headlight is the light intended mainly to ensure the field of view of the rider of the vehicle, and in general, is configured to switch between a high beam (running headlight) and a low beam (passing headlight).

The high beam, which emits light in a horizontal (upward) direction, ensures a field of view at a long distance. Generally, in order to avoid blinding or impairing the vision of a rider of a nearby or oncoming vehicle, the high beam is used in a situation where there is no vehicle or the like existing ahead at night. The low beam, which emits light in a downward direction, is used even in a situation where there is a vehicle or the like existing ahead. Therefore, in a normal case, a vehicle often runs with the low beam turned on.

When the vehicle that leans into turns is running on a straight road, an illumination range of a headlight light source (low beam) spreads evenly to the left and right in an area ahead in an advancing direction and below a horizontal plane including the headlight light source. When the vehicle that leans into turns is running on a road curving to the left, the vehicle runs with the vehicle body inclined to the left. Accordingly, the illumination range of the headlight light source spreads downward to the left. As a result, a closer position on a running lane is illuminated. Thus, the illumination range in an area inside the curve and ahead in the advancing direction is reduced.

Therefore, for the purpose of preventing a reduction in the illumination range which may be caused by inclination of the vehicle, a vehicle has been proposed in which, in addition to a main headlight that illuminates an area ahead of the vehicle, two right and left sub headlights that are turned on depending on the magnitude of a lean angle (angle of inclination of a vehicle body to the inner side of a curve relative to an upright state thereof) are provided as a headlight, so that the sub headlights are sequentially turned on along with an increase in the lean angle (See, for example, Japanese Patent No. 4864562).

In the vehicle disclosed in Japanese Patent No. 4864562, when, firstly, the lean angle increases to reach a predetermined value, a first sub headlight is turned on, so that an illumination range of the first sub headlight is added to an illumination range of the main headlight which has been reduced as a result of inclination of the vehicle. When the lean angle further increases to reach a predetermined value, a second sub headlight is turned on, so that an illumination range of the second sub headlight is added to the illumination ranges of the main headlight and the first sub headlight which have been reduced as a result of inclination of the vehicle. This can suppress a reduction in the illumination range which may be caused by inclination of the vehicle.

A situation under which the vehicle corners or turns at an intersection is not always the same, and there are a wide variety of running scenes. The present inventors have studied situations under which the vehicle disclosed in Japanese Patent No. 4864562 runs in a wide variety of scenes, and discovered the following problems.

To be specific, in a state in which the vehicle disclosed in Japanese Patent No. 4864562 is running in such various scenes, when the lean angle of the vehicle body gradually increases or decreases, the illumination range of the sub headlight within a rider's field of view largely changes, which sometimes causes the rider to feel uncomfortable. Moreover, in some cases, a time period occurs during which the illumination range of the sub headlight cannot sufficiently cover a position or area that the rider desires to see.

For example, even on a road having a curve with the same radius, some vehicles move through the curve at a relatively low speed, and other vehicles move through the curve at a relatively high speed. The lean angle of the vehicle passing at the high speed is larger than the lean angle of the vehicle passing at the low speed. That is, even though a vehicle moves through a road having a curve with the same radius, the lean angle varies depending on the vehicle speed.

In the vehicle disclosed in Japanese Patent No. 4864562, a reduction in the illumination range along with an increase in the lean angle is suppressed by turning on the first and second sub headlights. Nevertheless, when the vehicle moves through a road having a curve with the same radius, the illumination range of the sub headlight within the rider's field of view largely changes, which sometimes causes the rider to feel uncomfortable. Moreover, when the vehicle moves through a road having a curve with the same radius, a time period sometimes occurs during which the illumination range of the sub headlight cannot sufficiently cover a position or area that the rider desires to see.

Furthermore, even when the vehicle is running at the same speed, the lean angle is small in a curve with a large radius while the lean angle is large in a curve with a small radius. Accordingly, for example, in a case of continuously passing through a plurality of curves having different radii during touring on a mountain road, the lean angle changes in each curve even though the speed does not change so much.

In the vehicle disclosed in Japanese Patent No. 4864562, a reduction in the illumination range along with an increase in the lean angle is suppressed by turning on the first and second sub headlights. Nevertheless, in some cases, while the vehicle is running at the same speed, the illumination range of the sub headlight within the rider's field of view largely changes, which sometimes causes the rider to feel uncomfortable. Moreover, while the vehicle is running at the same speed, a time period sometimes occurs during which the illumination range of the sub headlight cannot sufficiently cover a position or area that the rider desires to see.

In this manner, in the vehicle disclosed in Japanese Patent No. 4864562, when the vehicle moves through a road having a curve with the same radius at different speeds or when the vehicle moves through different curves at the same speed, the illumination range of the sub headlight within the rider's field of view sometimes largely changes, and a time period sometimes occurs during which the illumination range of the sub headlight cannot sufficiently cover a position or area that the rider desires to see.

SUMMARY OF THE INVENTION

In view of the problems described above, preferred embodiments of the present invention reduce a change in an illumination range of a sub headlight within a rider's field of view in the course of a gradual increase or decrease in the lean angle of a vehicle body. Also, preferred embodiments of the present invention prevents an occurrence of a time period during which the illumination range cannot sufficiently cover a position or area that the rider desires to see in the course of a gradual increase or decrease in the lean angle of the vehicle body.

The present inventors have conducted intensive studies on the problems described above, and have discovered the following.

In a conventional technique such as that described in Japanese Patent No. 4864562, a sub headlight is turned on such that, along with an increase in the lean angle of a vehicle, an illumination range of the sub headlight starts to cover a position or area that has been out of the illumination range. In other words, in this conventional technique, the sub headlight is turned on based on the correspondence relationship between an increase in the lean angle and a reduction in the illumination range.

It is true that there is a correspondence relationship between an increase in the lean angle and a reduction in the illumination range, but merely turning on the sub headlight based on this correspondence relationship may sometimes cause the illumination range of the sub headlight within the rider's field of view to largely change. Additionally, a time period may sometimes occur during which the illumination range of the sub headlight cannot sufficiently cover a position or area that the rider desires to see.

This is because, at a time of passing through a curve, the position of the line of sight of the rider looking ahead in a path differs depending on the circumstances. For example, even in a curve having the same radius, when the vehicle speed is high, the rider seeks to see a position or area farther ahead in the path. Even though the vehicle speed is the same, when the lean angle is large, the rider seeks to see a position or area farther into the curve. In short, a change in the field of view ahead in the path at a time of passing through a curve is influenced by a change in the rider's line of sight which changes in accordance with a wide variety of running scenes. This point has to be considered, too, in order to solve the problems described above. The present inventors have made the above-described and other discoveries, and developed the preferred embodiments of the present invention.

According to a preferred embodiment of the present invention, a sub headlight unit, which is preferably for use in a vehicle that leans into turns, includes a plurality of sub headlight light sources arranged to illuminate, at one side with respect to a width direction of the vehicle, an area ahead and outward of the vehicle with respect to the width direction of the vehicle, wherein the brightness of the sub headlight light source changes in accordance with a lean angle of the vehicle, when the lean angle of the vehicle reaches a reference value that is individually set for each of the sub headlight light sources, the sub headlight light source exhibits a predetermined brightness, the reference values are greater than 0° and different from one another, and the reference values are set to be values sequentially increasing at intervals from 0° such that the interval is smaller as the reference value is greater.

The reference values are preferably greater than 0° and different from one another, and the reference values are preferably set to be values sequentially increasing at intervals from 0° such that the interval is smaller as the reference value is greater. In other words, the interval is large when the lean angle is small, and the interval is small when the lean angle is large. Accordingly, in the course of an increase in the lean angle along with inclination of a vehicle body, when the lean angle is smaller, an interval until the sub headlight light source exhibits the predetermined brightness is longer, while when the lean angle is larger, an interval from when the sub headlight light source exhibits the predetermined brightness to when the next sub headlight light source exhibits the predetermined brightness is shorter.

As described above, a change in the rider's field of view is caused by a change in an illumination range of a headlight and a change in the position or area that the rider desires to see. As the lean angle increases, the illumination range of the headlight gradually decreases, and the position or area that the rider desires to see is shifted to a position or area farther in an advancing direction or a position or area farther into a curve. Therefore, in a situation where the lean angle is relatively large, the rider's field of view is likely to be narrowed due to an increase in the lean angle. On the other hand, in a situation where the lean angle is relatively small, a change in the field of view due to an increase in the lean angle is small.

The interval until the sub headlight unit light source exhibits the predetermined brightness preferably varies depending on the degree of a change in the field of view caused in accordance with the lean angle. As a result, in the course of a gradual increase or decrease in the lean angle of the vehicle body, a change in the illumination range of the sub headlight within the rider's field of view can be reduced. Additionally, the occurrence of a time period during which the illumination range cannot sufficiently cover the position or area the rider desires to see is prevented.

Preferably, as the reference value set for the sub headlight light source is greater, a cut-off line of the sub headlight light source is inclined at a larger inclination angle relative to a horizontal line that is obtained when the vehicle in an upright state is seen from the front side thereof.

In this configuration, when the brightness of the sub headlight light source increases along with an increase in the lean angle, the cut-off line of the sub headlight light source is prevented from being above the horizontal line. This enables illumination to be efficiently performed with an illumination range suitable for each of a wide variety of running scenes, while preventing glare.

Preferably, the inclination angles of the cut-off lines of the respective sub headlight light sources are set to be values sequentially increasing at intervals from 0° such that the interval is smaller as the inclination angle is larger.

In this configuration, when the brightness changes in accordance with the lean angle, the cut-off line of the sub headlight light source can be moved close to the horizontal line but not above the horizontal line. This enables illumination to be performed with an illumination range suitable for each of a wide variety of running scenes, while more effectively preventing glare.

Preferably, as the reference value set for the sub headlight light source is greater, an outer edge of an illumination range of the sub headlight light source having a predetermined illuminance is located farther outward with respect to the width direction of the vehicle in a plan view.

This configuration enables illumination to be performed with an illumination range suitable for each of a wide variety of running scenes, while preventing a size increase.

Preferably, an optical axis of the sub headlight light source is fixed, and the reference values of the lean angle, each of which is set for each of the plurality of sub headlight light sources whose optical axes are fixed, are set to be values that sequentially increase at intervals from 0° such that the interval is smaller as the reference value is greater.

The optical axes of the plurality of sub headlight light sources preferably are fixed. Therefore, any movable mechanism and any movable member that move the optical axes of the sub headlight light sources are not provided. Accordingly, there is no necessity to increase the sizes of a movable mechanism and a movable member in order to widen a range that the illumination can reach. Thus, a size increase is prevented.

The plurality of sub headlight light sources are preferably located at the one side of the vehicle with respect to the width direction of the vehicle, the reference values of the lean angle, each of which is set for each of the plurality of sub headlight light sources located at the one side, are set to be values sequentially increasing at intervals from 0° such that the interval is smaller as the reference value is greater.

In this configuration, the illumination is provided by the plurality of sub headlight light sources that are located at one side of the vehicle with respect to the width direction of the vehicle toward a direction ahead of and lateral to the vehicle at the one side. Therefore, the distance from the light source to an illumination target can be shortened. This enables illumination to be more effectively performed with an illumination range suitable for each of a wide variety of running scenes.

In this configuration, moreover, for example, when the vehicle turns to the left, the sub headlight light sources provided at the left side of the vehicle with respect to the width direction of the vehicle illuminate an area ahead and at the left side of the vehicle. Therefore, all of a turning direction, the position of the light source that is turned on, and an illuminating direction are located at the left side with respect to the width direction of the vehicle. When, in this manner, the turning direction, the position of the light source that is turned on, and the illuminating direction are coincident with respect to the width direction of the vehicle, an uncomfortable feeling is not given to, for example, a rider of an oncoming vehicle.

Preferably, as the reference value set for the sub headlight light source is greater, a larger angle is formed in a plan view between an optical axis of the sub headlight light source and a center line of the vehicle in a front-back direction thereof.

In this configuration, when the lean angle increases, the sub headlight light source whose optical axis is directed more outward is brightened. This enables illumination to be performed with an illumination range more suitable for each of a wide variety of running scenes.

The center line of the vehicle in the front-back direction is a straight line that extends in the front-back direction of the vehicle while passing through the center of the vehicle with respect to the width direction of the vehicle on a horizontal plane located at the same level as a main headlight light source (low beam light source) of the vehicle. Accordingly, when the vehicle is shifted from the upright state into the leaning state, the center line is shifted laterally with respect to the width direction of the vehicle. The angle formed between the optical axis of the sub headlight light source and the center line is an angle formed therebetween, in a plan view, at a time when the sub headlight light source exhibits the predetermined brightness as a result of the sub headlight light source reaching the reference value.

Preferably, as the reference value set for the sub headlight light source is greater, an illumination range of the sub headlight light source is higher.

The brightnesses of the plurality of sub headlight light sources preferably are sequentially changed in accordance with an increase in the lean angle. As a result, the illumination range is widened upward and outward. This enables illumination to be performed with an illumination range suitable for each of a wide variety of running scenes, and at the same time enables illumination to be efficiently performed in accordance with an increase in the lean angle.

According to another preferred embodiment of the present invention, a sub headlight system, which is preferably for use in a vehicle that leans into turns, includes the sub headlight unit according to any one of the preferred embodiments of the present invention described above, a controller arranged and programmed to change the brightness of the sub headlight light source in accordance with the lean angle of the vehicle; and a detector arranged to detect a variable available to obtain the lean angle of the vehicle, wherein, when the lean angle of the vehicle reaches a reference value that is individually set for each of the sub headlight light sources, the controller causes the corresponding sub headlight light source to exhibit a predetermined brightness.

Accordingly, an AFS (Adaptive Front-Lighting System) is achieved by which, in the course of a gradual increase or decrease in the lean angle of the vehicle body, a change in the illumination range of the sub headlight within the rider's field of view can be reduced. Additionally, an AFS that prevents an occurrence of a time period during which the illumination range cannot sufficiently cover the position or area that the rider desires to see is achieved.

According to yet another preferred embodiment of the present invention, a vehicle that leans into turns includes the sub headlight system according to the above-described preferred embodiment of the present invention.

In such a vehicle, in the course of a gradual increase or decrease in the lean angle of the vehicle body, a change in the illumination range of the sub headlight within the rider's field of view can be reduced. Additionally, an occurrence of a time period during which the illumination range cannot sufficiently cover the position or area that the rider desires to see can be prevented.

With various preferred embodiments of the present invention, an optical axis is a straight line that moves through a light source and the center of a maximum illuminance portion of emitted light. The center of the maximum illuminance portion of the emitted light can be identified by emitting light from a light source to a screen that is placed ahead of the light source. This screen illuminance test can be implemented by a method specified in JIS D1619, for example. Also, the cut-off line and the illumination range having the predetermined illuminance can be identified based on a result (such as an isolux distribution map) of the screen illuminance test mentioned above. The cut-off line and the illumination range having the predetermined illuminance in a plan view can be identified based on a road-surface light distribution that is obtained by converting the result of the screen illuminance test mentioned above into the road-surface light distribution. The conversion into the road-surface light distribution can be implemented by a conventionally known method. To be specific, through commonly-used drawing and geometric calculation, conversion from a screen illuminance value into a road-surface illuminance value can be performed. In such a case, the following expression (I) is usable. In the following expression (I), D represents a light source, E represents a point on a road surface, and F represents a point of intersection at which the screen placed between D and E intersects with a straight line connecting D to E.

Road-surface illuminance $(Lx)$=Screen Illuminance $(Lx) \times [(\text{Distance between } D \text{ and } F(m))/(\text{Distance between } D \text{ and } E (m))]^2$ (I)

With various preferred embodiments of the present invention, in the course of a gradual increase or decrease in the lean angle of the vehicle, a change in the illumination range of the sub headlight body within the rider's field of view is significantly reduced. Additionally, an occurrence of a time period during which an illumination range cannot sufficiently cover a position or area a rider desires to see is prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 17 is a plan view for the comparison among illumination ranges having an illuminance $L_2$ ($L_2 > L_1$) under the same circumstances as in FIG. 16.

DETAILED DESCRIPTION OF THE PREFERRED EMBODIMENTS

Firstly, a description will be given of a result of studies the present inventors have conducted about the relationship between a cut-off line of a sub headlight light source and a position or area a rider desires to see.

Figure 1:
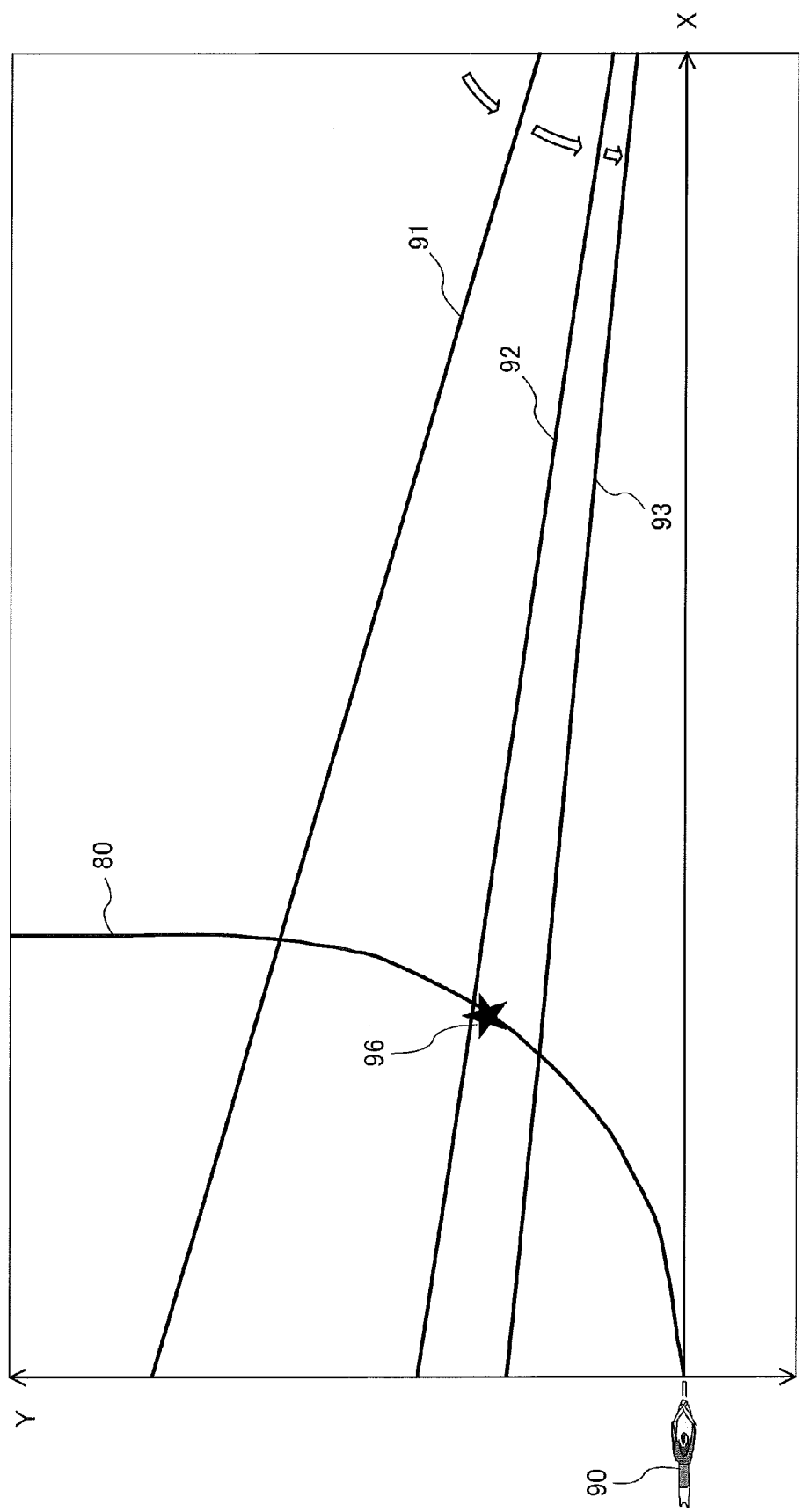
FIG. 1 is a diagram for explaining a situation where a vehicle moves through a curve.
Figure 2:
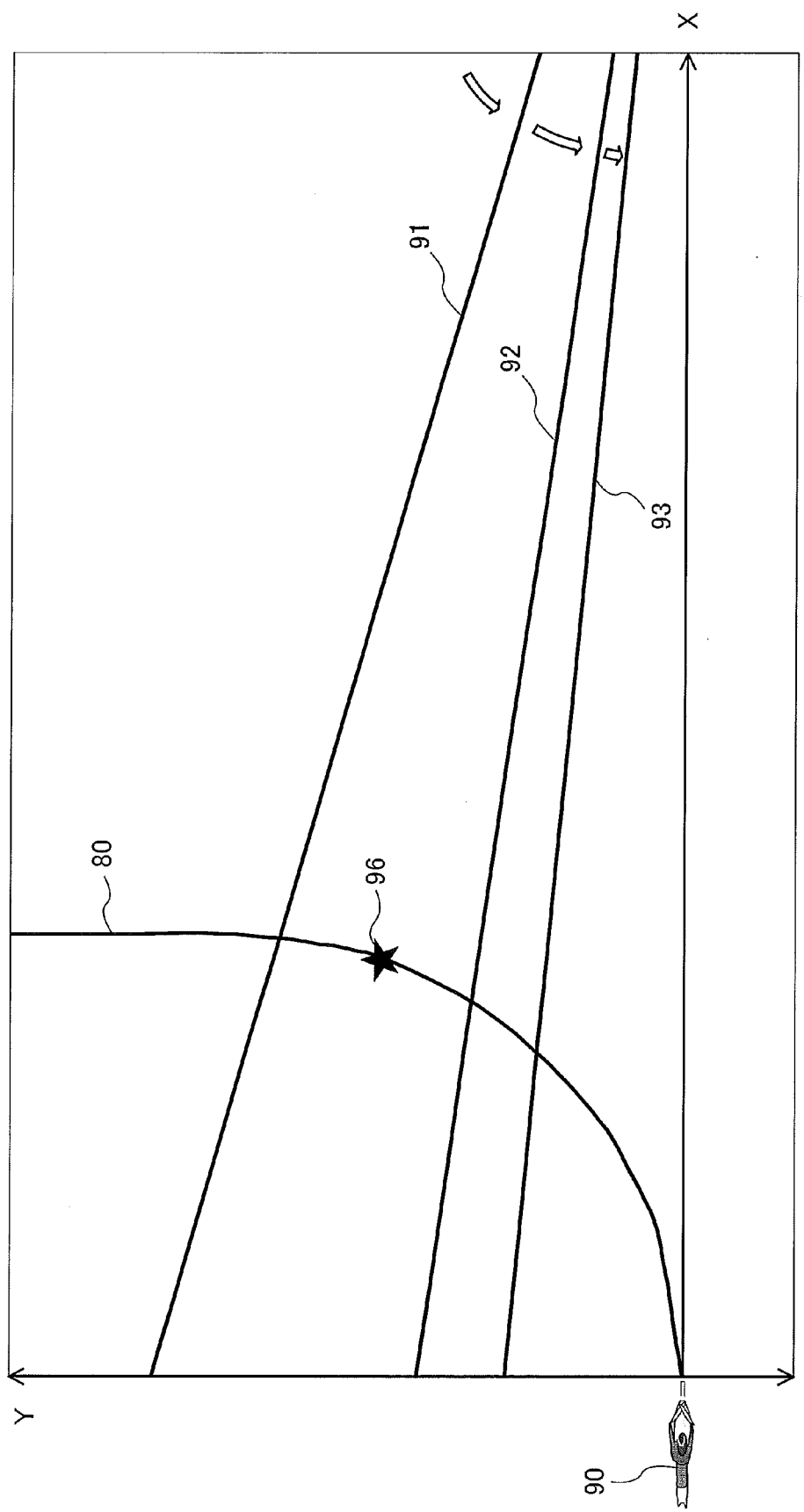
FIG. 2 is a plan view for explaining a situation where a vehicle moves through the curve shown in FIG. 1 at a speed higher than that of the vehicle shown in FIG. 1.
Figure 3:
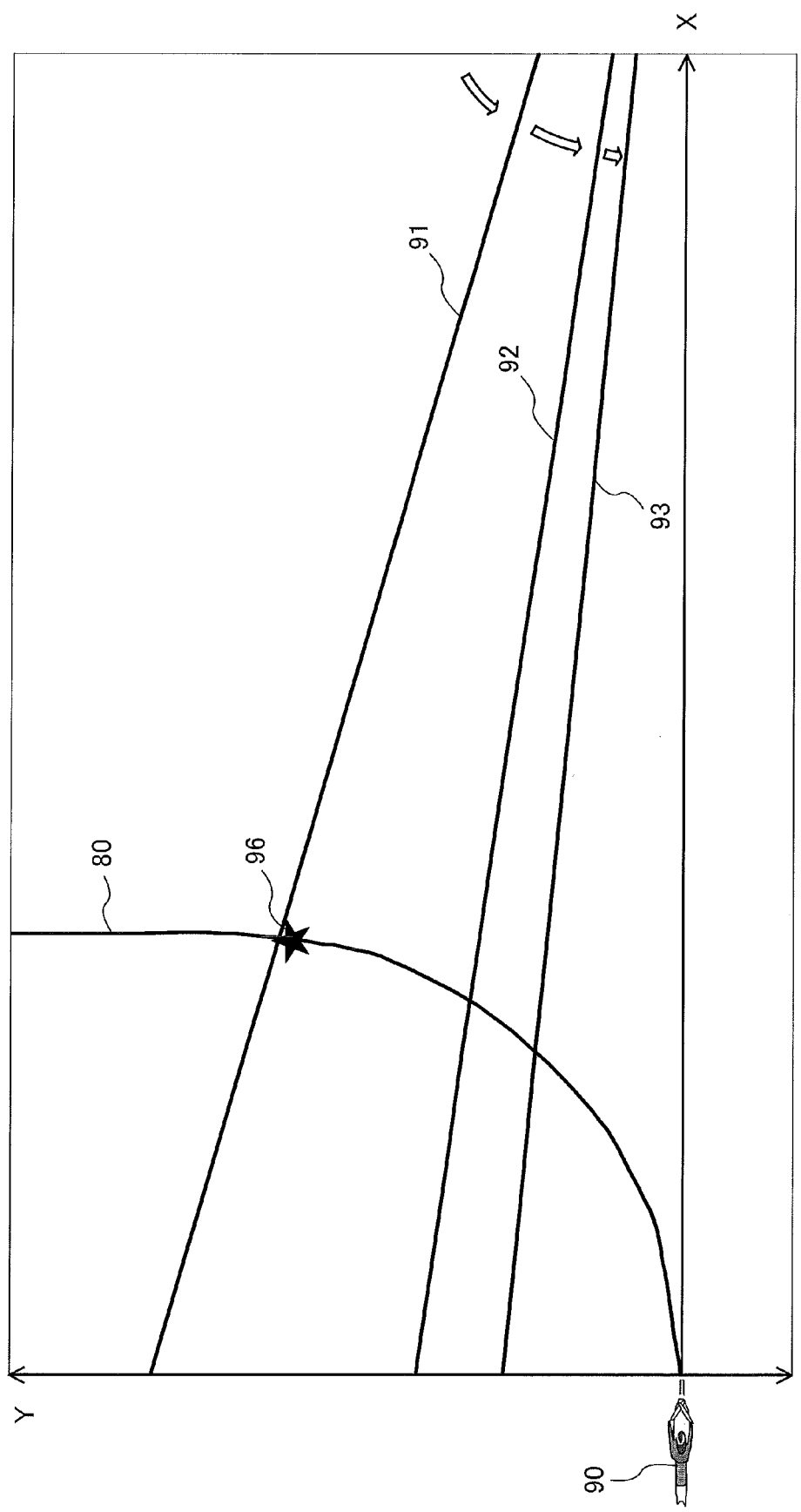
FIG. 3 is a plan view for explaining a situation where a vehicle moves through the curve shown in FIG. 1 at a speed higher than that of the vehicle shown in FIG. 2.

Firstly, with reference to FIGS. 1 to 3, a description will be given of the relationship between a cut-off line of a sub headlight light source and a position or area a rider desires to see in a case where a vehicle moves through a curve having a predetermined radius at different speeds. In FIGS. 1 to 3, X represents a straight ahead direction of a vehicle 90 that leans into turns, and Y represents the left side with respect to a width direction of the vehicle 90. The reference numeral 80 denotes a path of the vehicle 90. The path 80 curves to the left, with a predetermined radius.

A speed of the vehicle 90 increases sequentially from FIG. 1, FIG. 2, and FIG. 3. Accordingly, a lean angle of the vehicle 90 increases sequentially from FIG. 1, FIG. 2, and FIG. 3. The vehicle 90 preferably includes a plurality of sub headlight light sources (not shown) that illuminate an area ahead and outward of the vehicle 90 in accordance with the lean angle of the vehicle.

In this preferred embodiment, the number of the plurality of sub headlight light sources that illuminate one side with respect to the width direction of the vehicle preferably is three, for example. They are referred to as sub headlight light sources A to C. When the vehicle 90 is inclined at a lean angle P1 in FIG. 1, one sub headlight light source A is turned on. When the vehicle 90 is inclined at a lean angle P2 in FIG. 2, one sub headlight light source B is turned on. When the vehicle 90 is inclined at a lean angle P3 in FIG. 3, one sub headlight light source C is turned on. At times when the sub headlight light sources A to C are turned on, the same angle is formed in a plan view between a center line (in the drawings, the line indicating an advancing direction X) of the vehicle 90 in a front-back direction thereof and a illuminating direction of each of the sub headlight light sources A to C.

In FIG. 1, the vehicle 90 moves on the path 80 while turning to the left at the lean angle P1 (P1<P2<P3). The sub headlight light source A of the vehicle 90 is turned on at the lean angle P1 in FIG. 1. The cut-off line of the sub headlight light source A at this time point extends in parallel with the width direction Y of the vehicle in an area ahead in the advancing direction X (the outside of the right end of FIG. 1), though not shown in FIG. 1. In FIG. 1, the reference numerals 91, 92, and 93 denote the cut-off lines of the sub headlight light source A obtained when the vehicle 90 is further inclined to the left from the lean angle P1 in FIG. 1. The cut-off line (not shown) at the lean angle P1 in FIG. 1 moves sequentially to the positions of the cut-off lines 91, 92, and 93, in accordance with an increase in the lean angle of the vehicle 90. Until the cut-off line moves to the next position, the lean angle of the vehicle 90 increases by a constant increment p.

Accordingly, when the vehicle 90 is inclined to the left further through a certain angle p from the lean angle P1 in FIG. 1, the cut-off line of the sub headlight light source A moves to the position of the cut-off line 91. When the lean angle of the vehicle 90 further increases through the certain angle p, the cut-off line 91 moves to the position of the cut-off line 92. Then, when the lean angle of the vehicle 90 increases through the certain angle p, the cut-off line 92 moves to the position of the cut-off line 93. In a case where the lean angle of the vehicle 90 increases at a constant speed, a time interval q at which the lean angle P1 of the vehicle 90 increases sequentially to P1+p, P1+2 p, and P1+3 p is also constant.

In the drawings, the star sign 96 denotes a position or area that a rider of the vehicle 90 normally desires to see under the circumstances shown in FIG. 1. The position or area 96 that the rider desires to see is a position or area through which the vehicle 90 running along the path 80 under the circumstances shown in FIG. 1 will move a predetermined time period (r seconds) later.

The position or area 96 that the rider desires to see is a position or area that the rider desires to see at a time point when the vehicle 90 exists in the position shown in FIG. 1. The position or area 96 that the rider desires to see relatively moves along with the advance of the vehicle 90. That is, once the vehicle 90 running along the path 80 under the circumstances shown in FIG. 1 reaches the position or area 96 that the rider desires to see, the position or area 96 that the rider desires to see is a position or area that the rider desired to see the predetermined time period r prior to the current time. The position or area 96 that the rider desires to see is still located ahead on the path 80.

Under the above-described condition, when the vehicle 90 in FIG. 1 increases its lean angle P1 while running along the path 80, the cut-off line of the sub headlight light source A moves sequentially to the positions of the cut-off lines 91 and 92. At a time when the cut-off line of the sub headlight light source A moves beyond the position of the cut-off line 92, the cut-off line reaches the position or area 96 that the rider desires to see. At this time, the lean angle of the vehicle 90 is more than P1+2 p. A running time having elapsed since the vehicle 90 was at the lean angle P1 exceeds 2 q. In other words, in a case where the lean angle of the vehicle 90 increases from the lean angle P1, a time required for the cut-off line to reach the position or area 96 that the rider desires to see is about 2q.

Then, the cut-off line moves beyond the position or area 96 that the rider desires to see, and reaches the position of the cut-off line 93. When the cut-off line moves beyond the position or area 96 that the rider desires to see, the position or area 96 that the rider desires to see is no longer covered by an illumination range of the sub headlight light source A. This makes the rider's field of view dark.

Next, FIG. 2 will be described.

In FIG. 2, the vehicle 90 moves on the path 80 while turning to the left at the lean angle P2 (P1<P2<P3). The sub headlight light source B of the vehicle 90 is turned on at the lean angle P2 in FIG. 2. Similarly to a case shown in FIG. 1, the cut-off line of the sub headlight light source B at this time point extends in parallel with the width direction Y of the vehicle in an area ahead in the advancing direction X (the outside of the right end of FIG. 2), though not shown in FIG. 2. In FIG. 2, similarly to a case shown in FIG. 1, the cut-off lines 91, 92, and 93 indicate the cut-off lines of the sub headlight light source B obtained when the vehicle 90 is inclined farther to the left from the lean angle P2 in FIG. 2. The cut-off line (not shown) at the lean angle P2 in FIG. 2 moves sequentially to the positions of the cut-off lines 91, 92, and 93, in accordance with an increase in the lean angle of the vehicle 90. Until the cut-off line moves to the next position, the lean angle of the vehicle 90 increases by a constant increment p. Similarly to a case shown in FIG. 1, a time interval q at which the lean angle P2 of the vehicle 90 increases sequentially to P2+p, P2+2 p, and P2+3 p is also constant.

In a case shown in FIG. 2, the speed of the vehicle 90 is higher than in a case shown in FIG. 1. Accordingly, as compared with a case shown in FIG. 1, the position or area 96 that the rider desires to see is located farther from the vehicle 90 on the path 80.

Under the above-described condition, when the vehicle 90 in FIG. 2 increases its lean angle P2 while running along the path 80, the cut-off line of the sub headlight light source B moves beyond the position of the cut-off line 91. Then, at a time when the cut-off line of the sub headlight light source B reaches substantially the middle between the cut-off lines 91 and 92, the cut-off line reaches the position or area 96 that the rider desires to see. At this time, the lean angle of the vehicle 90 exceeds P2+p, but does not reach P2+2 p. A running time having elapsed since the lean angle was P2 is about 1.5 q. In other words, in a case where the lean angle of the vehicle 90 increases from the lean angle P2, a time required for the cut-off line to reach the position or area 96 that the rider desires to see is about 1.5 q.

Next, FIG. 3 will be described.

In FIG. 3, the vehicle 90 moves on the path 80 while turning to the left at the lean angle P3 (P1<P2<P3). Except for the speed and the lean angle of the vehicle 90, FIG. 3 is the same as FIGS. 1 and 2, and therefore a description thereof will be omitted. In a case shown in FIG. 3, the speed of the vehicle 90 is higher than that in a case shown in FIG. 2. Accordingly, as compared with a case shown in FIG. 2, the position or area 96 that the rider desires to see is located still farther from the vehicle 90 on the path 80.

Under the above-described condition, when the vehicle 90 in FIG. 3 increases its lean angle P3 while running along the path 80, the cut-off line of the sub headlight light source C moves beyond the position of the cut-off line 91. At this time point, the cut-off line reaches the position or area 96 that the rider desires to see. At this time, the lean angle of the vehicle 90 is about P3+p. A running time having elapsed since the lean angle was P3 is about 1 q. In other words, in a case where the lean angle of the vehicle 90 increases from the lean angle P3, a time required for the cut-off line to reach the position or area 96 that the rider desires to see is about 1 q.

As has been described with reference to FIGS. 1 to 3, in a case where the lean angle of the vehicle 90 running on the path 80 increases from each of the lean angles P1 to P3, a time required until the cut-off line reaches the position or area 96 that the rider desires to see varies depending on the initial lean angle.

In a case of the lean angle P1, the required time is about 2 q (FIG. 1).

In a case of the lean angle P2, the required time is about 1.5 q (FIG. 2).

In a case of the lean angle P3, the required time is about 1 q (FIG. 3).

In this manner, even in a case where the radius of a curve is the same, the time required until the cut-off line of the sub headlight light source reaches the position or area that the rider desires to see is shorter as the vehicle speed is higher, that is, as the lean angle is larger.

Accordingly, in a preferred embodiment of the present invention, an interval until the sub headlight light source exhibits a predetermined brightness is longer as the vehicle speed is lower (as the lean angle is smaller), while an interval from when the sub headlight light source exhibits a predetermined brightness to when the next sub headlight light source exhibits a predetermined brightness is shorter as the vehicle speed is higher (as the lean angle is larger). As a result, even in a case where the vehicle speed varies, a change in the illumination range of the sub headlight within the rider's field of view in the course of a gradual increase or decrease in the lean angle of the vehicle body can be significantly reduced. Additionally, an occurrence of a time period during which the illumination range cannot sufficiently cover the position or area that the rider desires to see is prevented.

Figure 4:
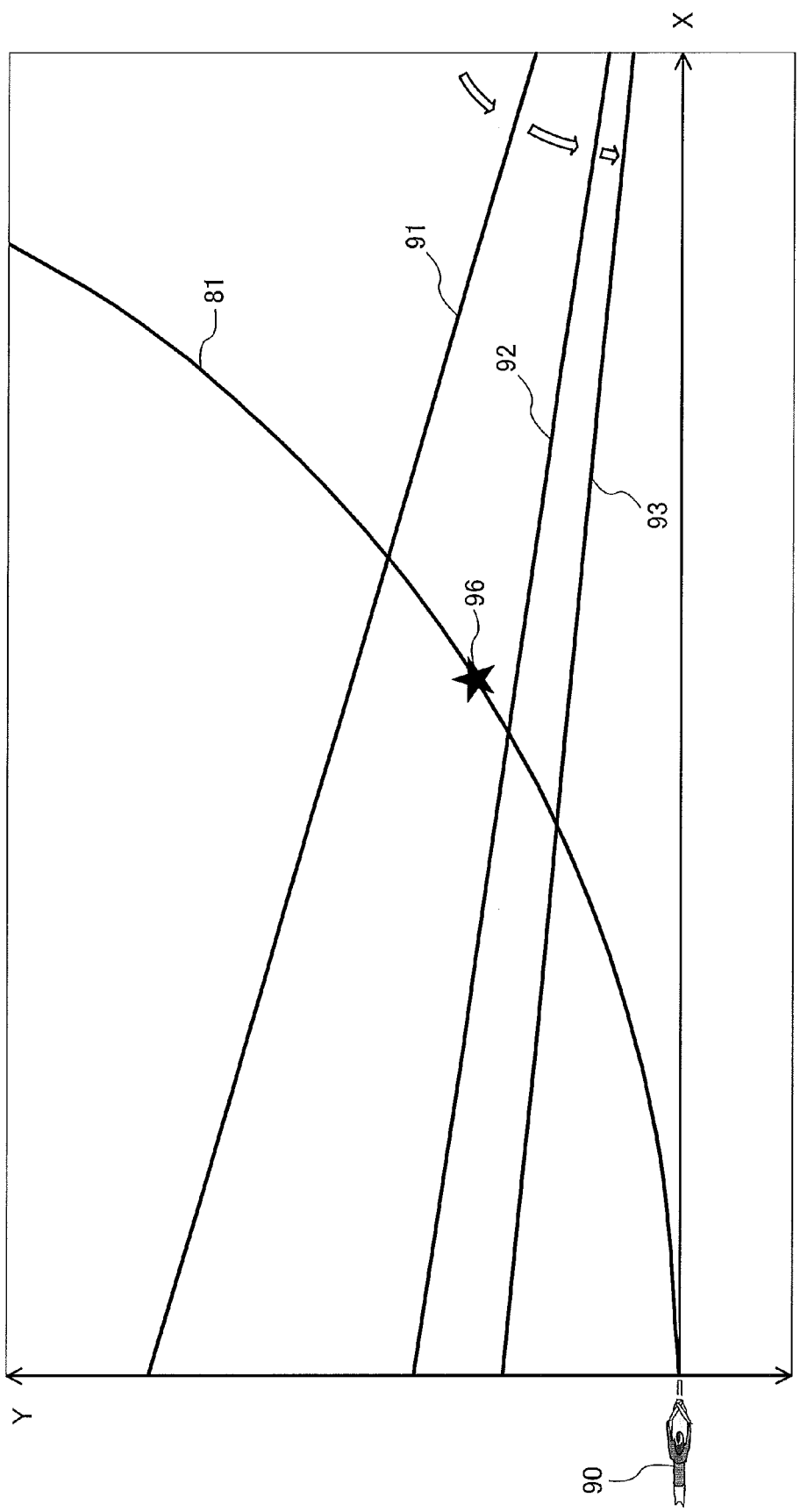
FIG. 4 is a diagram for explaining another situation where a vehicle moves through a curve.
Figure 5:
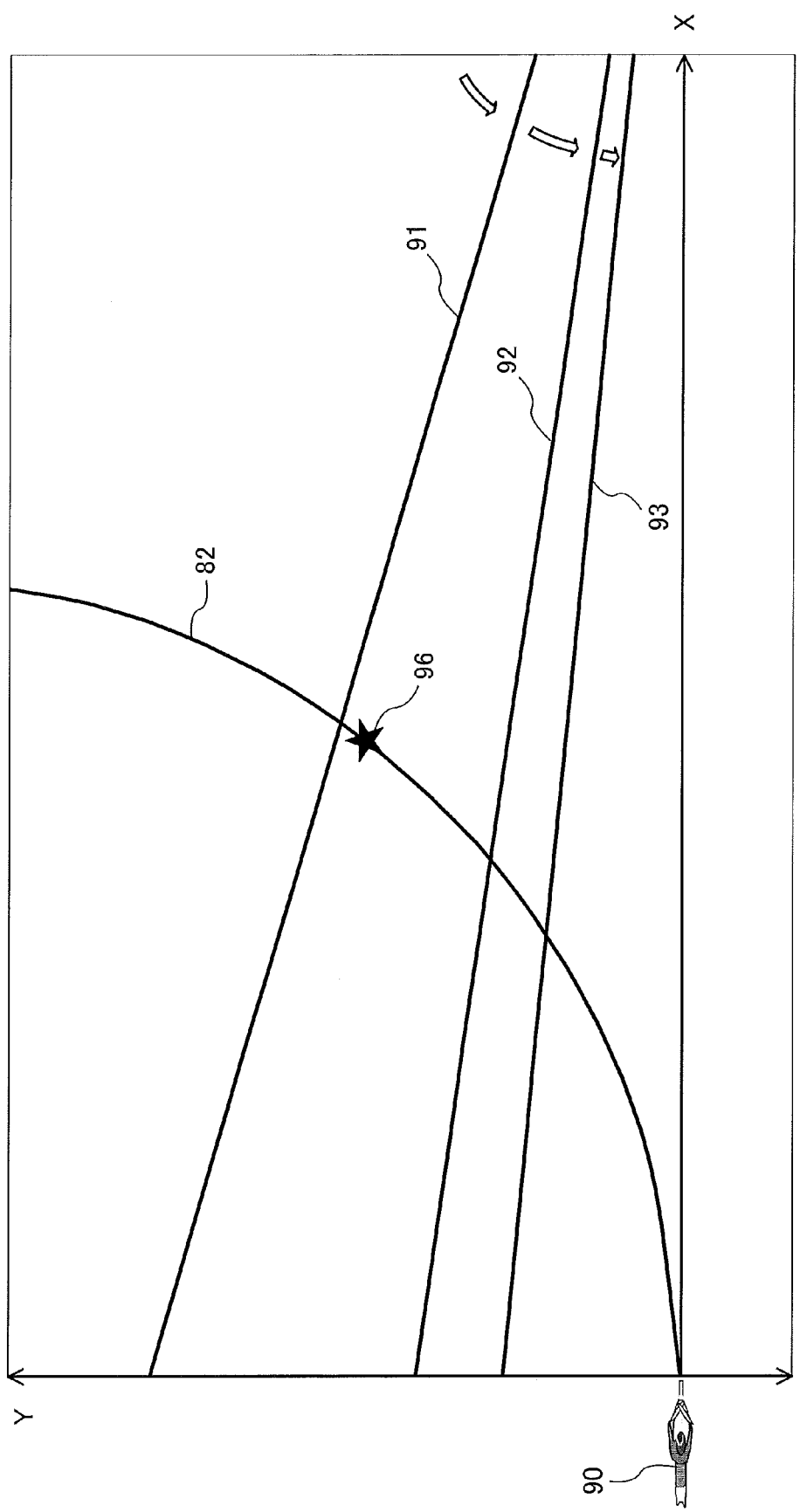
FIG. 5 is a plan view for explaining a situation where a vehicle moves through a curve having a smaller radius than that of the curve shown in FIG. 4, at the same speed as that of the vehicle shown in FIG. 4.
Figure 6:
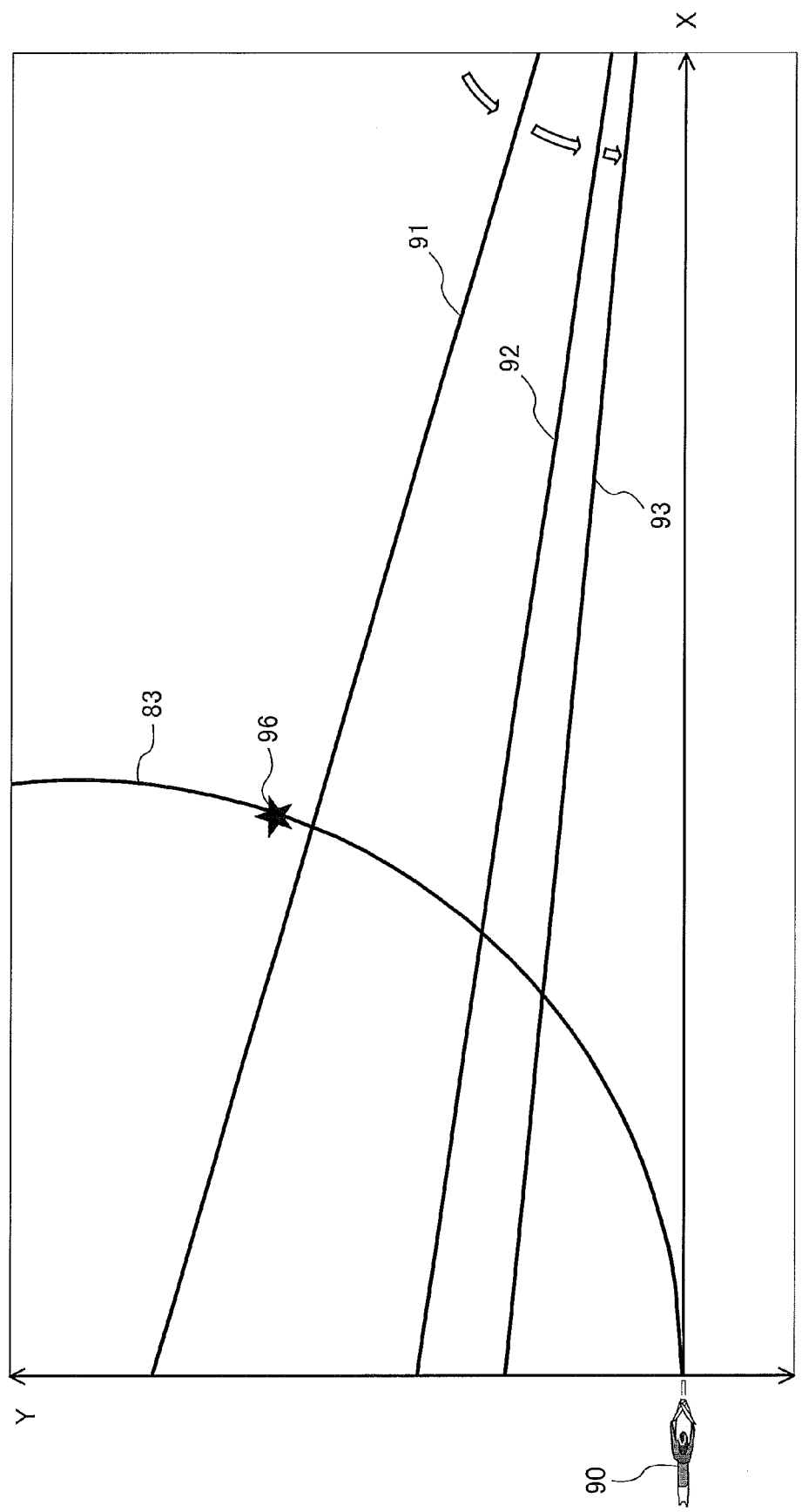
FIG. 6 is a plan view for explaining a situation where a vehicle moves through a curve having a smaller radius than that of the curve shown in FIG. 5, at the same speed as that of the vehicle shown in FIG. 4.

Next, with reference to FIGS. 4 to 6, a description will be given of the relationship between the cut-off line of the sub headlight light source and the position or area that the rider desires to see in a case where the vehicle moves through different curves at the same speed. In FIGS. 4 to 6, the vehicle 90 moves through different curves at the same speed, while in FIGS. 1 to 3, the vehicle 90 moves through the same curve at different speeds. Except for this point, contents of FIGS. 4 to 6 are the same as contents of FIGS. 1 to 3. In the following, therefore, differences of FIGS. 4 to 6 from FIGS. 1 to 3 will be described, and a description of the points common to FIGS. 1 to 3 and FIGS. 4 to 6 will be omitted.

In FIGS. 4 to 6, the reference numerals 81, 82, and 83 denote paths of the vehicle 90. The paths 81, 82, and 83 curve to the left. The radius of the path decreases in the order of the path 81 shown in FIG. 4, the path 82 shown in FIG. 5, and the path 83 shown in FIG. 6. Accordingly, the lean angle of the vehicle 90 increases in the order of FIG. 4, FIG. 5, and FIG. 6.

In FIG. 4, the vehicle 90 moves on the path 81 while turning to the left at the lean angle P1 (P1<P2<P3). The sub headlight light source A of the vehicle 90 is turned on at the lean angle P1 in FIG. 4. Under these circumstances, similarly to a case shown in FIG. 1, in a case of increasing the lean angle P1, at a time when the cut-off line of the sub headlight light source A moves beyond the cut-off line 91 and reaches the vicinity of the cut-off line 92, the cut-off line reaches the position or area 96 that the rider desires to see. At this time, the lean angle of the vehicle 90 is about P1+2 p. A running time having elapsed since the lean angle was P1 is about 2 q. In other words, in a case where the lean angle of the vehicle 90 increases from the lean angle P1, a time required for the cut-off line to reach the position or area 96 that the rider desires to see is about 2 q.

In FIG. 5, the vehicle 90 moves on the path 82 while turning to the left at the lean angle P2 (P1<P2<P3). The sub headlight light source B of the vehicle 90 is turned on at the lean angle P2 in FIG. 5. Under these circumstances, similarly to a case shown in FIG. 2, in a case of increasing the lean angle P2, a time when the cut-off line of the sub headlight light source B moves beyond the cut-off line 91, the cut-off line reaches the position or area 96 that the rider desires to see. At this time, the lean angle of the vehicle 90 is about P2+p. A running time having elapsed since the lean angle was P2 is about q. In other words, in a case where the lean angle of the vehicle 90 increases from the lean angle P2, a time required for the cut-off line to reach the position or area 96 that the rider desires to see is about q.

In FIG. 6, the vehicle 90 moves on the path 83 while turning to the left at the lean angle P3 (P1<P2<P3). The sub headlight light source C of the vehicle 90 is turned on at the lean angle P3 in FIG. 6. Under these circumstances, similarly to a case shown in FIG. 3, in a case of increasing the lean angle P3, before the cut-off line reaches the cut-off line 91, the cut-off line of the sub headlight light source C reaches the position or area 96 that the rider desires to see. At this time, the lean angle of the vehicle 90 is less than P3+p. A running time having elapsed since the lean angle was P3 is less than q. In other words, in a case where the lean angle of the vehicle 90 increases from the lean angle P3, a time required for the cut-off line to reach the position or area 96 that the rider desires to see is less than q.

As has been described with reference to FIGS. 4 to 6, in a case where the lean angle of the vehicle 90 increases from the lean angles P1 to P3, a time required until the cut-off line reaches the position or area 96 that the rider desires to see varies depending on the initial lean angle.

In a case of the lean angle P1, the required time is about 2 q (FIG. 4).

In a case of the lean angle P2, the required time is about 1 q (FIG. 5).

In a case of the lean angle P3, the required time is less than 1 q (FIG. 6).

In this manner, even in a case of passing through a curve at the same speed, the time required until the cut-off line of the sub headlight light source reaches the position or area that the rider desires to see is shorter as the radius of the curve is smaller, that is, as the lean angle is larger.

Accordingly, in a preferred embodiment of the present invention, an interval until the sub headlight light source exhibits a predetermined brightness is longer as the radius is larger (as the lean angle is smaller), while an interval from when the sub headlight light source exhibits a predetermined brightness to when the next sub headlight light source exhibits a predetermined brightness is shorter as the radius is smaller (as the lean angle is larger). As a result, even in a case where the radius varies, a change in the illumination range of the sub headlight within the rider's field of view in the course of a gradual increase or decrease in the lean angle of the vehicle body is significantly reduced. Additionally, an occurrence of a time period during which the illumination range cannot sufficiently cover the position or area that the rider desires to see is prevented.

Figure 7:
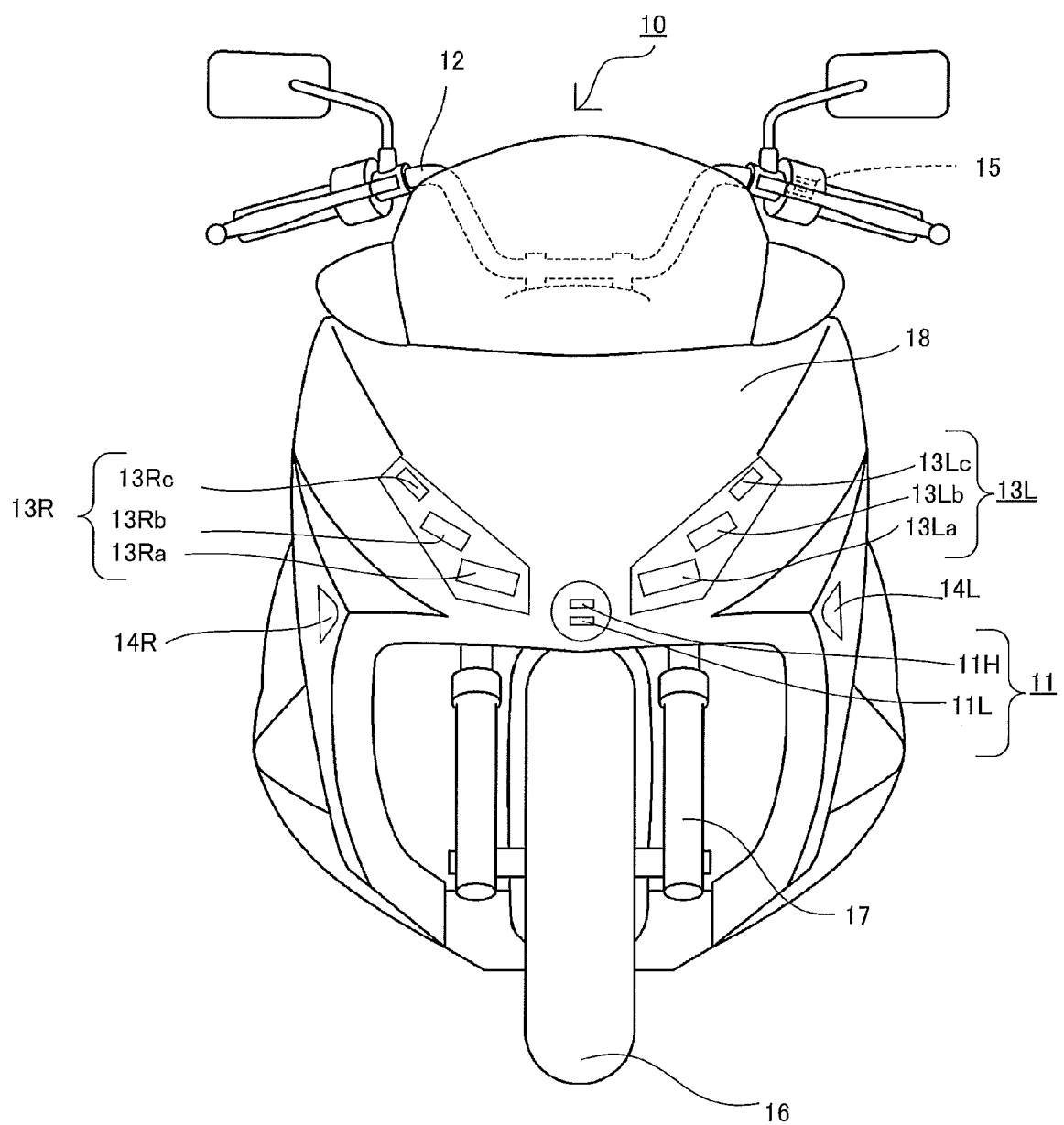
FIG. 7 is a front elevational view schematically showing a motorcycle according to a preferred embodiment of the present invention.

FIG. 7 is a front elevational view schematically showing a motorcycle according to a preferred embodiment of the present invention.

A motorcycle 10 is a non-limiting example of a vehicle that leans into turns according to a preferred embodiment of the present invention. In the present invention, no particular limitation is put on the vehicle that leans into turns. For example, saddle-ride type vehicles including motorcycles, three-wheeled motor vehicles, snowmobiles, and ATVs (all terrain vehicles) may be provided. In the following description, the terms "front" and "back" are terms with respect to the advancing direction of the vehicle, the terms "up" and "down" are terms with respect to the vertical direction of the vehicle, and the terms "right" and "left" are terms with respect to the rider.

The motorcycle 10 includes a handlebar 12. An operation switch 15 is provided preferably in a left portion of the handlebar 12 with respect to the width direction of the vehicle. The operation switch 15 includes a beam switch 15B and a flasher switch 15F (see FIG. 8). A steering shaft (not shown) is fixed to a center portion of the handlebar 12 with respect to the width direction of the vehicle. The steering shaft extends downward through a headpipe (not shown). A front-fork 17 is provided at a lower end of the steering shaft. A front wheel 16 is rotatably supported at the lower end of the front-fork 17. The headpipe is a member constituting a vehicle body frame. In the present invention, no particular limitation is put on the vehicle body frame, and a conventional known configuration is adoptable.

A front cover 18 covers a front portion of the headpipe having the steering shaft passing therethrough. On a front surface of the front cover 18, a main headlight 11 is provided in a center portion with respect to the width direction of the vehicle. The main headlight 11 includes a high beam light source 11H (running headlight) and a low beam light source 11L (passing headlight). The high beam light source 11H illuminates an area ahead of the motorcycle 10 at a height equal to or above a horizontal plane of the main headlight 11. The low beam light source 11L illuminates an area ahead of the motorcycle 10 at a height below the horizontal plane of the main headlight 11.

The high beam light source 11H and the low beam light source 11L are configured such that preferably only one of them is turned on at one time. The rider operates the beam switch 15B (see FIG. 8), and thereby turn-on of the high beam light source 11H and turn-on of the low beam light source 11L are switched.

The motorcycle 10 includes a sub headlight 13. The sub headlight 13 preferably includes two sub headlight units 13L and 13R of variable light distribution type. Each of the sub headlight units 13L and 13R is provided at each side with respect to the width direction of the vehicle. The sub headlight unit 13L preferably includes a plurality of sub headlight light sources 13La, 13Lb, and 13Lc, for example. The sub headlight light sources 13La, 13Lb, and 13Lc are arranged in this order from the center toward the upper left with respect to the width direction of the vehicle. Illumination ranges of the sub headlight light sources 13La, 13Lb, and 13Lc are arranged in this order from the center toward the upper left with respect to the width direction of the vehicle. The illumination ranges of the sub headlight light sources 13La, 13Lb, and 13Lc overlap one another. The sub headlight unit 13R includes a plurality of sub headlight light sources 13Ra, 13Rb, and 13Rc. The sub headlight light sources 13Ra, 13Rb, and 13Rc are arranged in this order from the center toward the upper right with respect to the width direction of the vehicle. Illumination ranges of the sub headlight light sources 13Ra, 13Rb, and 13Rc are arranged in this order from the center toward the upper right with respect to the width direction of the vehicle. The illumination ranges of the sub headlight light sources 13Ra, 13Rb, and 13Rc overlap one another. Optical axes of the sub headlight light sources 13La to 13Lc and 13Ra to 13Rc are fixed, and not moved in accordance with the lean angle. A reflector (not shown) of the sub headlight light source is also fixed, and not moved in accordance with the lean angle. In the present preferred embodiment, no particular limitation is put on the sub headlight light source. For example, an LED is adoptable. A mono-focus type light source is also adoptable as the sub headlight light source. As for how the sub headlight light sources 13La to 13Lc and 13Ra to 13Rc are arranged in the motorcycle 10, the above-described arrangement is merely an illustrative example of a preferred embodiment of the present invention. The present invention is not limited to this example.

Flashers 14L and 14R, serving as direction indicators, are provided at both sides of the motorcycle 10 with respect to the width direction of the vehicle. The flashers 14L and 14R are configured such that preferably only one of them flashes at one time, except for when a hazard light mode is activated. The rider operates the flasher switch 15F (see FIG. 8), and thereby flashing/turn-off of the flashers 14L and 14R is switched.

The plurality of sub headlight light sources 13La, 13Lb, and 13Lc, which are positioned at the left side in the motorcycle 10 with respect to the width direction of the vehicle, are preferably arranged between the main headlight 11 and the flasher 14L. The plurality of sub headlight light sources 13Ra, 13Rb, and 13Rc, which are positioned at the right side in the motorcycle 10, are preferably arranged between the main headlight 11 and the flasher 14R. In the present invention, no particular limitation is put on the positional relationship between the sub headlight light source and the flasher with respect to the width direction of the vehicle. For example, it may be acceptable that the sub headlight light source is provided outside the flasher with respect to the width direction of the vehicle.

The plurality of sub headlight light sources 13La, 13Lb, and 13Lc are preferably provided above the main headlight 11 and the flasher 14L. The plurality of sub headlight light sources 13Ra, 13Rb, and 13Rc are preferably provided above the main headlight 11 and the flasher 14R.

The plurality of sub headlight light sources 13La to 13Lc, which are preferably provided to the left with respect to the width direction of the vehicle, illuminate an area ahead and at the left side of the motorcycle 10. The plurality of sub headlight light sources 13Ra to 13Rc, which are provided to the right with respect to the width direction of the vehicle, illuminate an area ahead and at the right side of the motorcycle 10.

Figure 8:
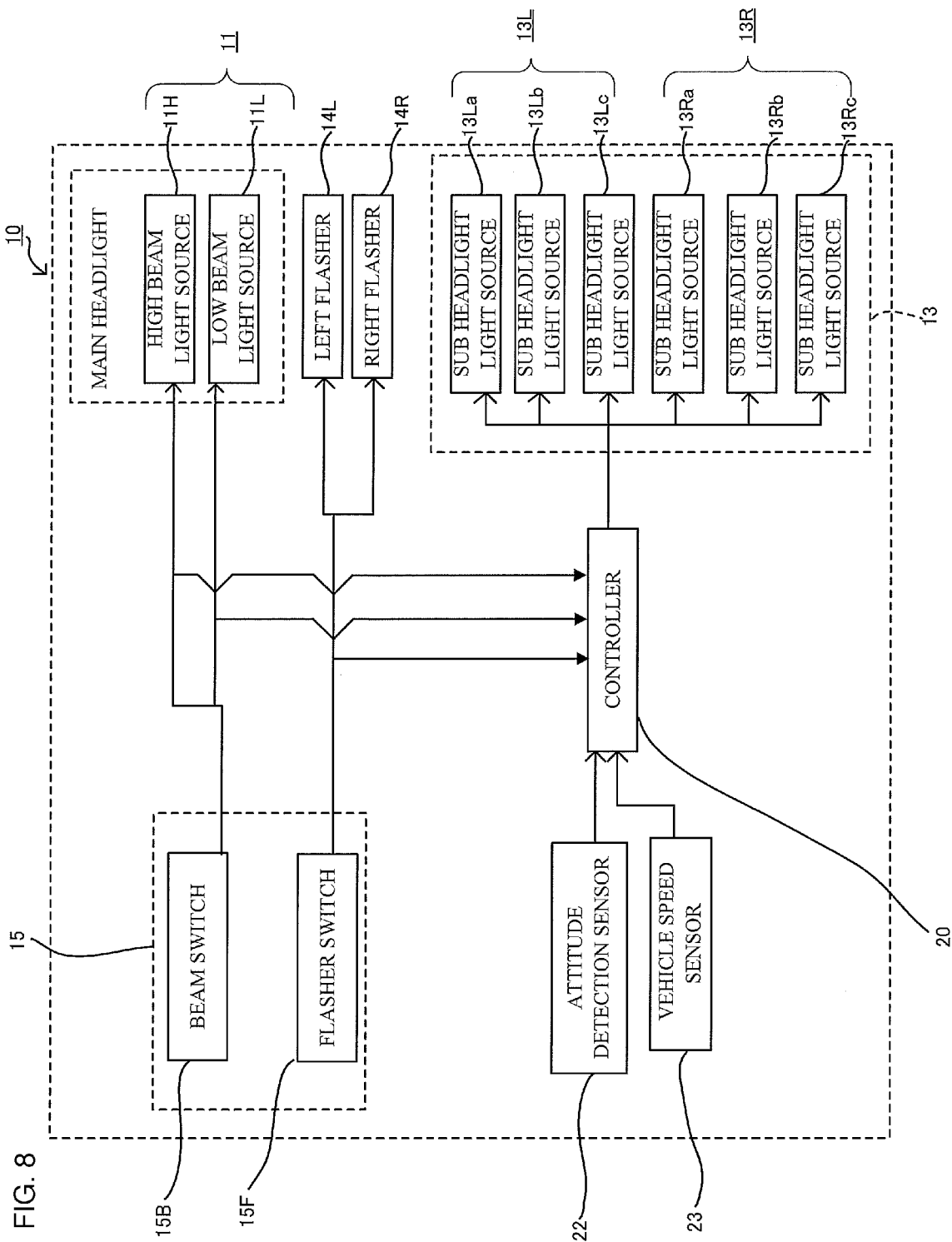
FIG. 8 is a block diagram showing a basic configuration concerning sub headlight light sources of the motorcycle shown in FIG. 7.

FIG. 8 is a block diagram showing a basic configuration concerning the sub headlight light sources of the motorcycle shown in FIG. 7.

The operation switch 15 preferably includes the beam switch 15B and the flasher switch 15F. The beam switch 15B is connected to the high beam light source 11H and the low beam light source 11L included in the main headlight 11. When the rider operates the beam switch 15B, turn-on/turn-off of the high beam light source 11H and the low beam light source 11L is switched in accordance with the operation performed on the beam switch 15B.

The flasher switch 15F is connected to the flashers 14L and 14R. When the rider operates the flasher switch 15F, one of the flashers 14L and 14R is caused to flash in accordance with the operation performed on the flasher switch 15F.

In the motorcycle 10, an attitude detection sensor 22 and a vehicle speed sensor 23 are preferably provided. In this preferred embodiment, the attitude detection sensor 22 preferably is a gyro sensor that detects the angular velocity about an axis in the front-back direction of the motorcycle 10. The attitude detection sensor 22 supplies, to a controller 20, a signal indicating the detected angular velocity (e.g., roll rate) about the axis in the front-back direction. The vehicle speed sensor 23 detects the vehicle speed, and supplies, to the controller 20, a signal indicating the detected vehicle speed. Each time a predetermined timing comes during running, the controller 20 calculates the lean angle of the motorcycle 10 based on the angular velocity about the axis in the front-back direction and the vehicle speed.

In the present preferred embodiment, the roll rate preferably is integrated over time, and the vehicle speed is used as correction information, thereby calculating the lean angle. However, in the present invention, a method for calculating the lean angle is not limited to this example. In the calculation of the lean angle, the vehicle speed is not an essential variable. For calculating the lean angle, a conventionally known method is adoptable. For example, the calculation may be performed based on a static equilibrium equation by using the yaw rate (angular velocity about an axis in the vertical direction) and the vehicle speed. The correction information is not limited to the vehicle speed. For example, it may be acceptable to provide a plurality of gyro sensors and G sensors and use values obtained from these sensors and the vehicle speed as the correction information. Instead of the vehicle speed, GPS position information and/or geomagnetic information may be used as the correction information. No particular limitation is put on sensors (detectors) that detect variables that are available to obtain the lean angle. An appropriate sensor may be provided in accordance with variables available for the calculation.

The controller 20 preferably includes a memory (not shown). The memory stores, in the form of data, a plurality of reference values (°) to be compared with the lean angle. In the present preferred embodiment, the memory preferably stores three reference values (a first reference value $K_1$, a second reference value $K_2$, and a third reference value $K_3$). The first reference value $K_1$, the second reference value $K_2$, and the third reference value $K_3$ satisfy the relationship of first reference value $K_1$<second reference value $K_2$<third reference value $K_3$.

The first reference value $K_1$ is associated with the sub headlight light sources 13La and 13Ra.

The second reference value $K_2$ is associated with the sub headlight light sources 13Lb and 13Rb.

The third reference value $K_3$ is associated with the sub headlight light sources 13Lc and 13Rc.

That is, the first to third reference values $K_1$ to $K_3$ are greater than 0°, and different from one another. The first to third reference values $K_1$ to $K_3$ are set to be values sequentially increasing at intervals from 0°. The interval between 0° and $K_1$ is $K_1$. When the interval between $K_2$ and $K_1$ is defined as $K_2'$ and the interval between $K_3$ and $K_2$ is defined as $K_3'$, the intervals $K_1$, $K_2'$, and $K_3'$ satisfy $K_1 > K_2' > K_3'$. In other words, a greater reference value ($K_1$ to $K_3$) has a smaller interval ($K_1$, $K_2'$, $K_3'$).

In the motorcycle 10, in the course of a gradual increase in the lean angle along with left inclination of the motorcycle 10, when the lean angle reaches the first reference value $K_1$, the sub headlight light source 13La is turned on, and when the lean angle reaches the second reference value $K_2$, the sub headlight light source 13Lb is turned on, and when the lean angle reaches the third reference value $K_3$, the sub headlight light source 13Lc is turned on. Thus, the sub headlight light sources 13La, 13Lb, and 13Lc are sequentially turned on along with an increase in the lean angle. On the other hand, when the lean angle decreases, the sub headlight light sources 13Lc, 13Lb, and 13La are sequentially turned off. The same applies to a case where the motorcycle 10 is inclined to the right.

In a preferred embodiment of the present invention, when the lean angle is less than a minimum reference value ($K_1$) (for example, at a time of running straight ahead), the sub headlight light source may be dimmed. In such a case, when the sub headlight light sources 13La, 13Lb, and 13Lc are sequentially turned on along with an increase in the lean angle, the sub headlight light sources 13Rc, 13Rb, and 13Ra may be sequentially turned off.

More specifically, when the vehicle is inclined to one side (for example, to the left) with respect to the width direction of the vehicle so that the lean angle increases, the brightness of the plurality of sub headlight light sources (13La to 13Lc) that illuminate this one side may be increased in the order from the sub headlight light source (13La) having the illumination range whose upper end edge is located lower to the sub headlight light source (13Lc) having the illumination range whose upper end edge is located upper, while the brightness of the plurality of sub headlight light sources (13Rc to 13Ra) that illuminate the other side (right side) of the vehicle with respect to the width direction of the vehicle may be reduced in the order from the sub headlight light source (13Rc) having the illumination range whose upper end edge is located upper to the sub headlight light source (13Ra) having the illumination range whose upper end edge is located lower.

Figure 9:
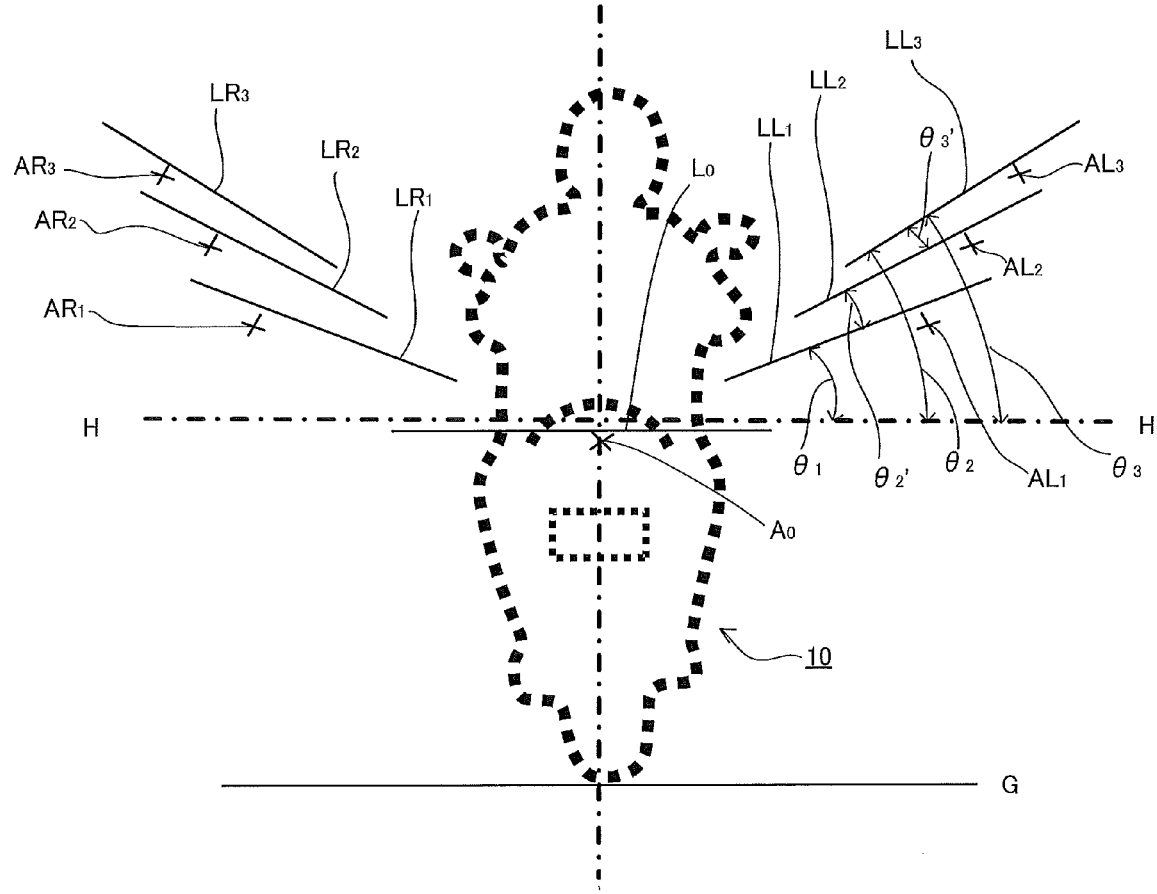
FIG. 9 is a front elevational view schematically showing optical axes and cut-off lines of the sub headlight light sources of the motorcycle in an upright state.

FIG. 9 is a front elevational view schematically showing optical axes and cut-off lines of the sub headlight light sources of the motorcycle in an upright state.

As shown in FIG. 9, the motorcycle 10 stands upright on a flat ground G. An optical axis $A_0$ of the low beam light source 11L is located below a horizon H of the low beam light source 11L. A cut-off line $L_0$ of the low beam light source 11L is located above the optical axis $A_0$, and located below the horizon H of the low beam light source 11L. The cut-off line $L_0$ extends right and left along the width direction of the vehicle.

The optical axes $AL_1$ to $AL_3$ of the sub headlight light sources 13La to 13Lc are located outward in the order of the optical axes $AL_1$ to $AL_3$ with respect to the width direction of the vehicle. The optical axes $AL_1$ to $AL_3$ of the sub headlight light sources 13La to 13Lc are located above the optical axis $A_0$ of the low beam light source 11L. With respect to the width direction of the motorcycle 10, outer edges of the illumination ranges of the sub headlight light sources 13La to 13Lc having a predetermined illuminance are, similarly to the optical axes $AL_1$ to $AL_3$, located outward with respect to the width direction of the vehicle in the order of the sub headlight light sources 13La to 13Lc, though not shown in FIG. 9.

Inclination angles $\theta_1$ to $\theta_3$ of cut-off lines $LL_1$ to $LL_3$ of the sub headlight light sources 13La to 13Lc increase in the order of the inclination angles $\theta_1$ to $\theta_3$.

The inclination angles $\theta_1$ to $\theta_3$ of the cut-off lines $LL_1$ to $LL_3$ of the sub headlight light sources 13La to 13Lc are set to be values increasing at intervals from 0° to $\theta_1$, $\theta_2$, and $\theta_3$ in this order. The interval between 0° and $\theta_1$ is $\theta_1$. When the interval between $\theta_2$ and $\theta_1$ is defined as $\theta_2'$ and the interval between $\theta_3$ and $\theta_2$ is defined as $\theta_3'$, the intervals $\theta_1$, $\theta_2'$, and $\theta_3'$ satisfy $\theta_1 > \theta_2' > \theta_3'$. In other words, a larger inclination angle ($\theta_1$ to $\theta_3$) has a smaller interval ($\theta_1$, $\theta_2'$, $\theta_3'$).

No particular limitation is put on the relationship between the inclination angle ($\theta_1$ to $\theta_3$) of the cut-off line ($LL_1$ to $LL_3$)

of each sub headlight light source (13La to 13Lc) and the reference value ($K_1$ to $K_3$) set for the sub headlight light source (13La to 13Lc). These values (angles) may either be different or the same. A state where these values are the same includes a state where these values are substantially the same.

The cut-off lines $LL_1$ to $LL_3$ of the sub headlight light sources 13La to 13Lc define the upper end edges of the illumination ranges of the sub headlight light sources 13La to 13Lc, respectively, though not shown in FIG. 9. Therefore, the illumination ranges of the sub headlight light sources 13La to 13Lc are located below the cut-off lines $LL_1$ to $LL_3$ of the sub headlight light sources 13La to 13Lc. Accordingly, the illumination ranges of the sub headlight light sources 13La to 13Lc are, in this order, located upper upward. As the illumination ranges of the sub headlight light sources 13La to 13Lc are located upper, the outer edges of the illumination range of the sub headlight light sources 13La to 13Lc having the predetermined illuminance are located more outwardly. Except for whether the sub headlight light sources are provided at the right side or the left side of the symmetry, the sub headlight light sources 13Ra to 13Rc are preferably identical to the sub headlight light sources 13La to 13Lc described above. Therefore, a description thereof will be omitted.

Figure 10:
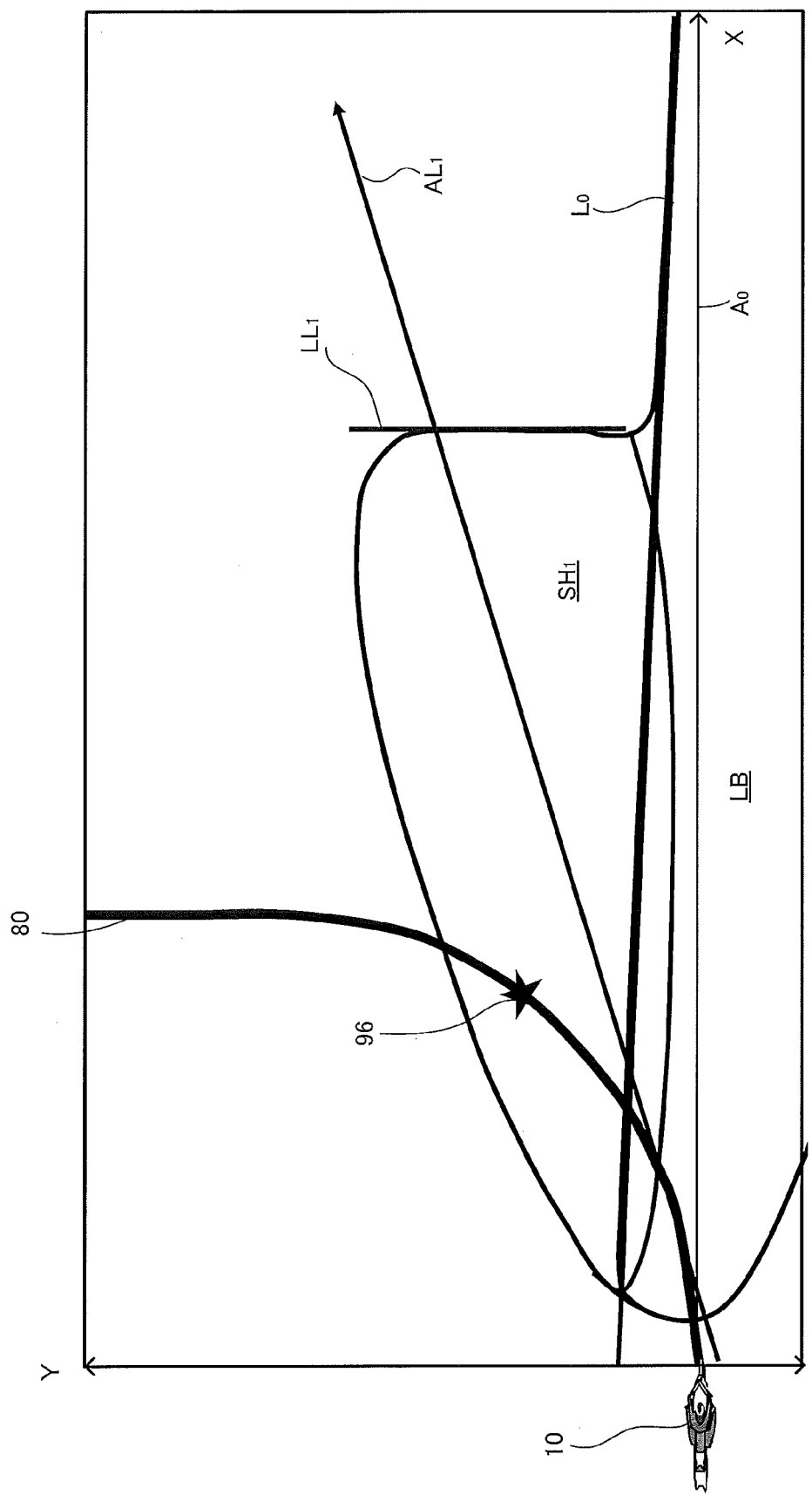
FIG. 10 is a plan view schematically showing an illumination range of a headlight having an illuminance $L_1$ in a case where a vehicle moves through a curve having a radius $R_1$ at a speed V'.
Figure 11:
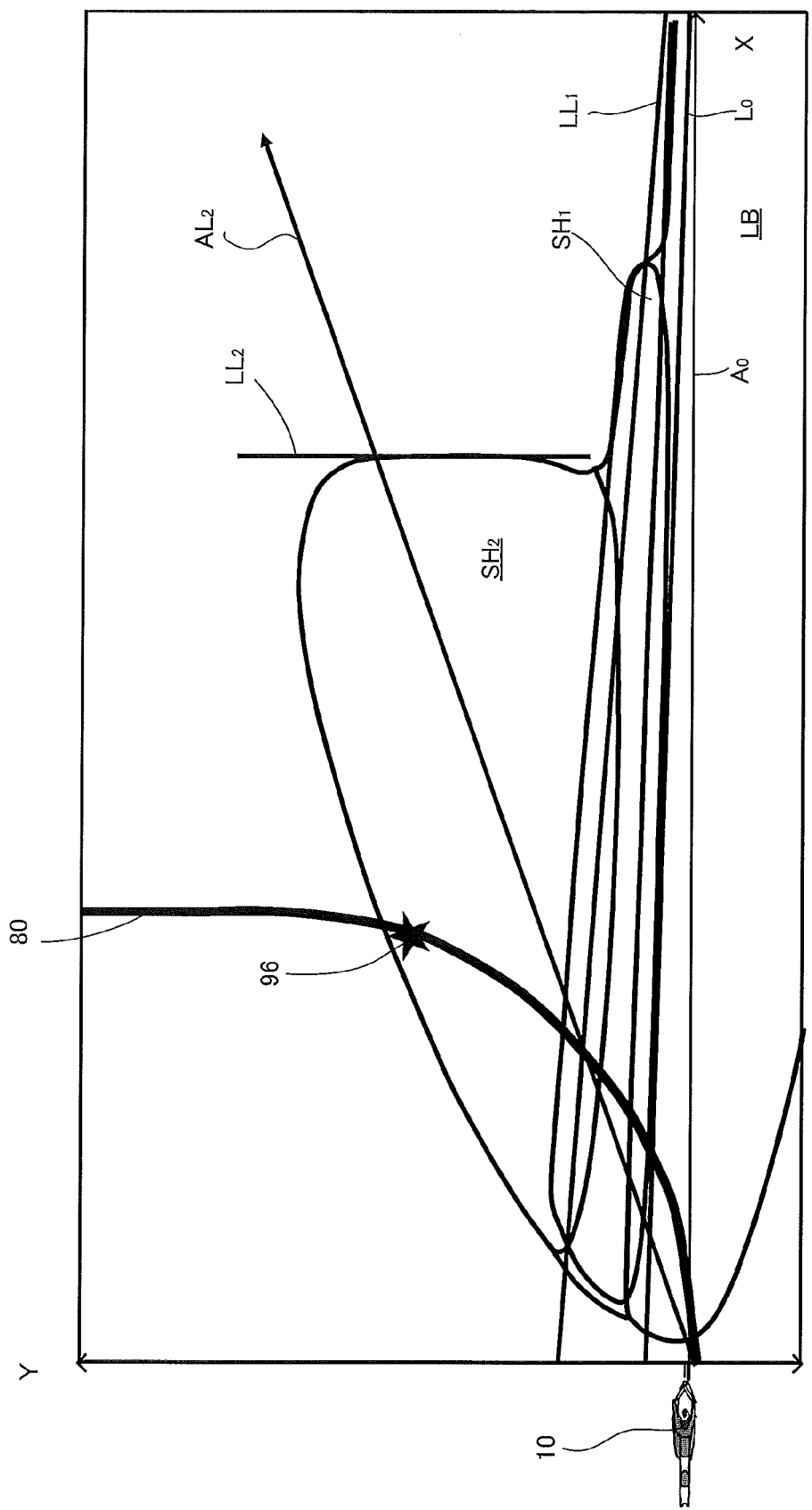
FIG. 11 is a plan view schematically showing an illumination range of a headlight having the illuminance $L_1$ in a case where a vehicle moves through a curve having the radius $R_1$ at a speed $V_2$.
Figure 12:
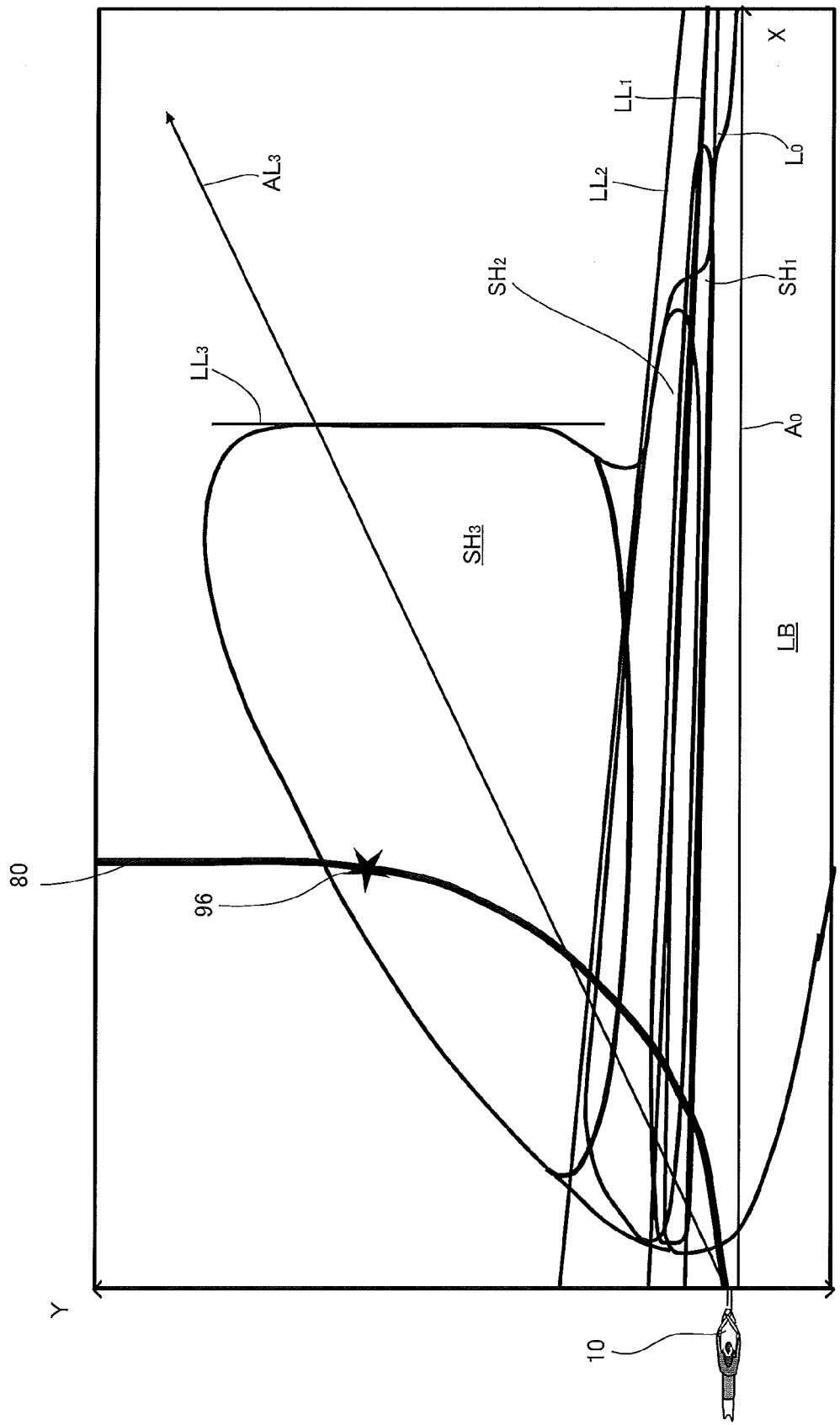
FIG. 12 is a plan view schematically showing an illumination range of a headlight having the illuminance $L_1$ in a case where a vehicle moves through a curve having the radius $R_1$ at a speed $V_3$.

Next, with reference to FIGS. 10 to 12, a description will be given of the illumination ranges of the low beam light source 11L (main headlight 11) and the sub headlight light sources 13La to 13Lc in a case where the motorcycle 10 described above moves through a curve having the radius $R_1$ at the different speeds $V_1$, $V_2$, and $V_3$. In FIGS. 10 to 12, X represents a straight ahead direction of the motorcycle 10 that leans into turns, and Y represents the left side with respect to the width direction of the motorcycle 10. The reference numeral 80 denotes a path of the motorcycle 10. The path 80 curves to the left, with a predetermined radius. The speed of the motorcycle 10 increases in the order of the speeds $V_1$, $V_2$, and $V_3$.

In FIG. 10, the motorcycle 10 moves on the path 80 while turning to the left at the speed $V_1$ (lean angle P1). The sub headlight light source 13La of the motorcycle 10 is turned on at the lean angle P1. FIG. 10 shows a state at this time.

An illumination range LB of the low beam light source 11L having the illuminance $L_1$ spreads ahead of the motorcycle 10 along the advancing direction X. Since the motorcycle 10 is inclined at the lean angle P1, the cut-off line $L_0$ of the low beam light source 11L approaches to the motorcycle 10 from the left side of the motorcycle 10 beyond the position or area 96 that the rider desires to see. Therefore, the position or area 96 that the rider desires to see is not covered by the illumination range LB of the low beam light source 11L having the illuminance $L_1$.

However, the sub headlight light source 13La produces illumination along the optical axis $AL_1$, so that an illumination range $SH_1$ of the sub headlight light source 13La having the illuminance $L_1$ covers the position or area 96 that the rider desires to see. Accordingly, the brightness of the rider's field of view is ensured. The cut-off line $LL_1$ of the sub headlight light source 13La extends right and left along the width direction of the vehicle.

In FIG. 11, the motorcycle 10 moves on the path 80 while turning to the left at the speed $V_2$ (lean angle P2). The sub headlight light source 13Lb of the motorcycle 10 is turned on at the lean angle P2. FIG. 11 shows a state at this time.

The illumination range LB of the low beam light source 11L having the illuminance $L_1$ spreads ahead of the motorcycle 10 along the advancing direction X. The illumination range $SH_1$ of the sub headlight light source 13La having the illuminance $L_1$ extends in the advancing direction X, along a left side edge of the illumination range LB of the low beam light source 11L having the illuminance $L_1$. Since the motorcycle 10 is inclined at the lean angle P2, the cut-off line $LL_1$ of the sub headlight light source 13La approaches to the motorcycle 10 from the left side of the motorcycle 10 beyond the position or area 96 that the rider desires to see. Therefore, the position or area 96 that the rider desires to see is not covered by the illumination range $SH_1$ of the sub headlight light source 13La having the illuminance $L_1$.

However, the sub headlight light source 13Lb produces illumination along the optical axis $AL_2$, so that an illumination range $SH_2$ of the sub headlight light source 13Lb having the illuminance $L_1$ covers the position or area 96 that the rider desires to see. Accordingly, the brightness of the rider's field of view is ensured. The cut-off line $LL_2$ of the sub headlight light source 13Lb extends right and left along the width direction of the vehicle.

In FIG. 12, the motorcycle 10 moves on the path 80 while turning to the left at the speed $V_3$ (lean angle P3). The sub headlight light source 13Lc of the motorcycle 10 is turned on at the lean angle P3. FIG. 12 shows a state at this time.

The illumination range LB of the low beam light source 11L having the illuminance $L_1$ spreads ahead of the motorcycle 10 along the advancing direction X. Each of the illumination ranges $SH_1$ and $SH_2$ of the sub headlight light sources 13La and 13Lb having the illuminance $L_1$ extends ahead in the advancing direction X, along the left side edge of the illumination range LB of the low beam light source 11L having the illuminance $L_1$. Since the motorcycle 10 is inclined at the lean angle P3, the cut-off line $LL_2$ of the sub headlight light source 13Lb approaches to the motorcycle 10 from the left side of the motorcycle 10 beyond the position or area 96 that the rider desires to see. Therefore, the position or area 96 that the rider desires to see is not covered by the illumination range $SH_2$ of the sub headlight light source 13Lb having the illuminance $L_1$.

However, the sub headlight light source 13Lc produces illumination along the optical axis $AL_3$, so that an illumination range $SH_3$ of the sub headlight light source 13Lc having the illuminance $L_1$ covers the position or area 96 that the rider desires to see. Accordingly, the brightness of the rider's field of view is ensured. The cut-off line $LL_3$ of the sub headlight light source 13Lc extends right and left along the width direction of the vehicle.

As shown in FIGS. 10 to 12, in the course of the motorcycle 10 increasing the lean angle while turning to the left, the sub headlight light source 13La is firstly turned on when the cut-off line $L_0$ of the low beam light source 11L is approaching to the motorcycle 10 from the left side of the motorcycle 10, and the sub headlight light source 13Lb is turned on when the cut-off line $LL_1$ of the sub headlight light source 13La is approaching to the motorcycle 10 from the left side of the motorcycle 10.

In this manner, when the cut-off line of the illumination range is approaching, the next sub headlight light source is turned on. As a result, the position or area that the rider desires to see is covered by the illumination range of this next sub headlight light source.

In this preferred embodiment, the reference values $K_1$ to $K_3$ set for the sub headlight light sources 13La to 13Lc preferably increase in the order of the reference values $K_1$ to $K_3$. As the reference value $K_1$ to $K_3$ is greater, the interval ($K_1$, $K_2'$, $K_3'$) thereof is smaller. This enables the sub headlight light sources to be sequentially turned on at good timings. Thus, a change in the illumination range within the rider's field of view is significantly reduced. Additionally, an occurrence of a time period during which the illumination range cannot sufficiently cover the position or area 96 that the rider desires to see is prevented.

Figure 13:
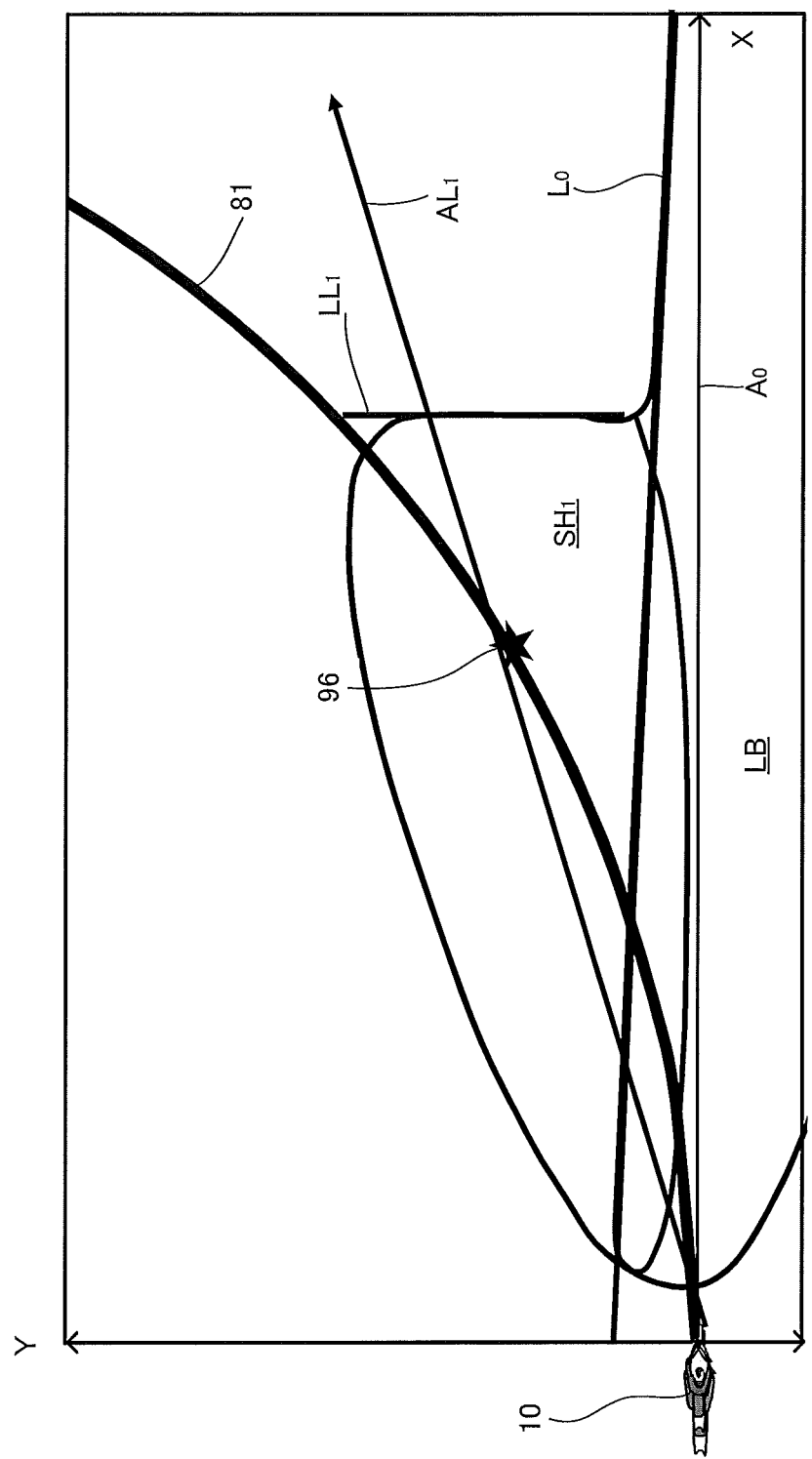
FIG. 13 is a plan view schematically showing an illumination range of a headlight having the illuminance $L_1$ in a case where a vehicle moves through a curve having a radius $R_4$ at a speed $V_4$.
Figure 14:
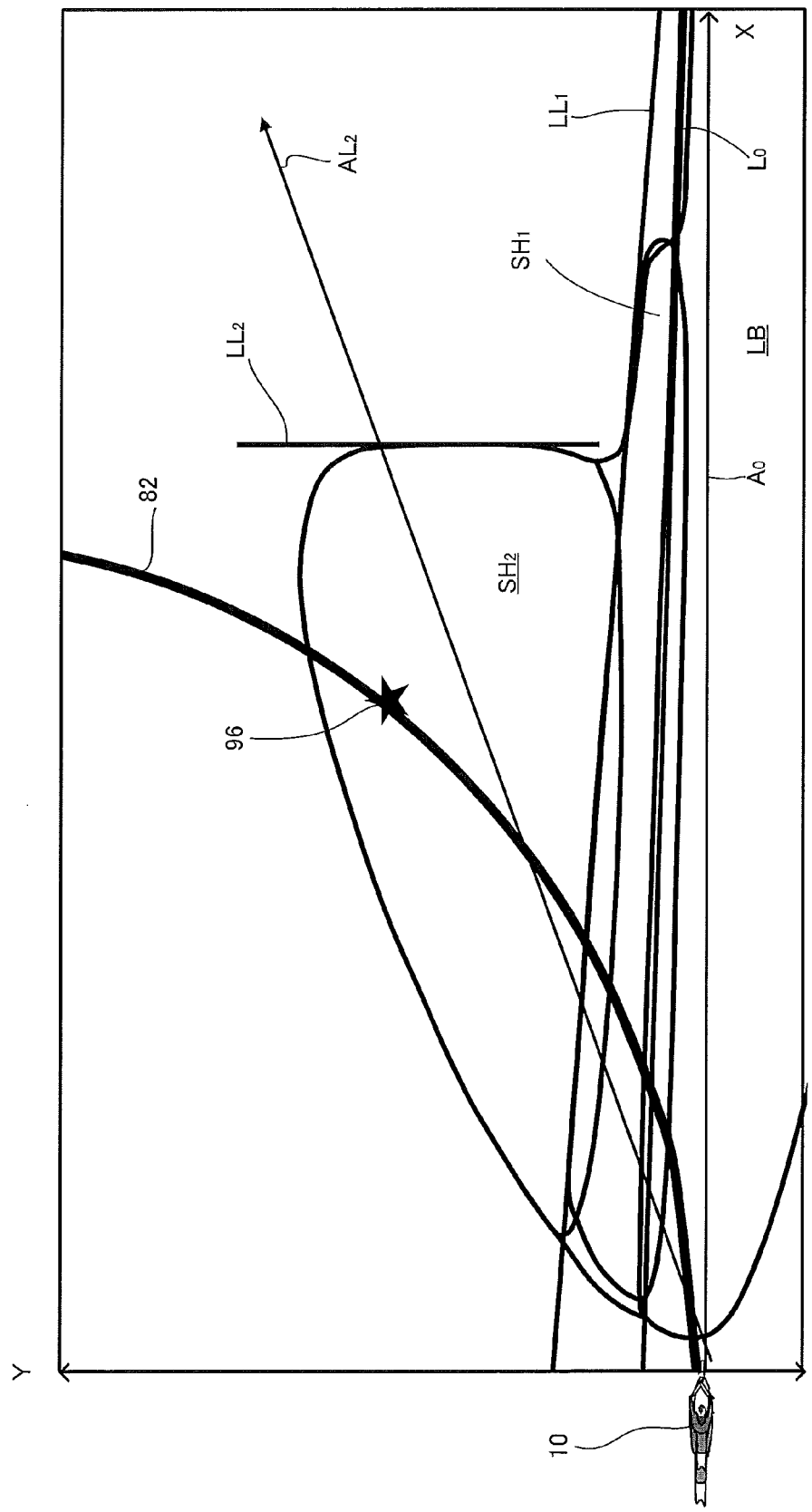
FIG. 14 is a plan view schematically showing an illumination range of a headlight having the illuminance $L_1$ in a case where a vehicle moves through a curve having a radius $R_3$ at the speed $V_4$.
Figure 15:
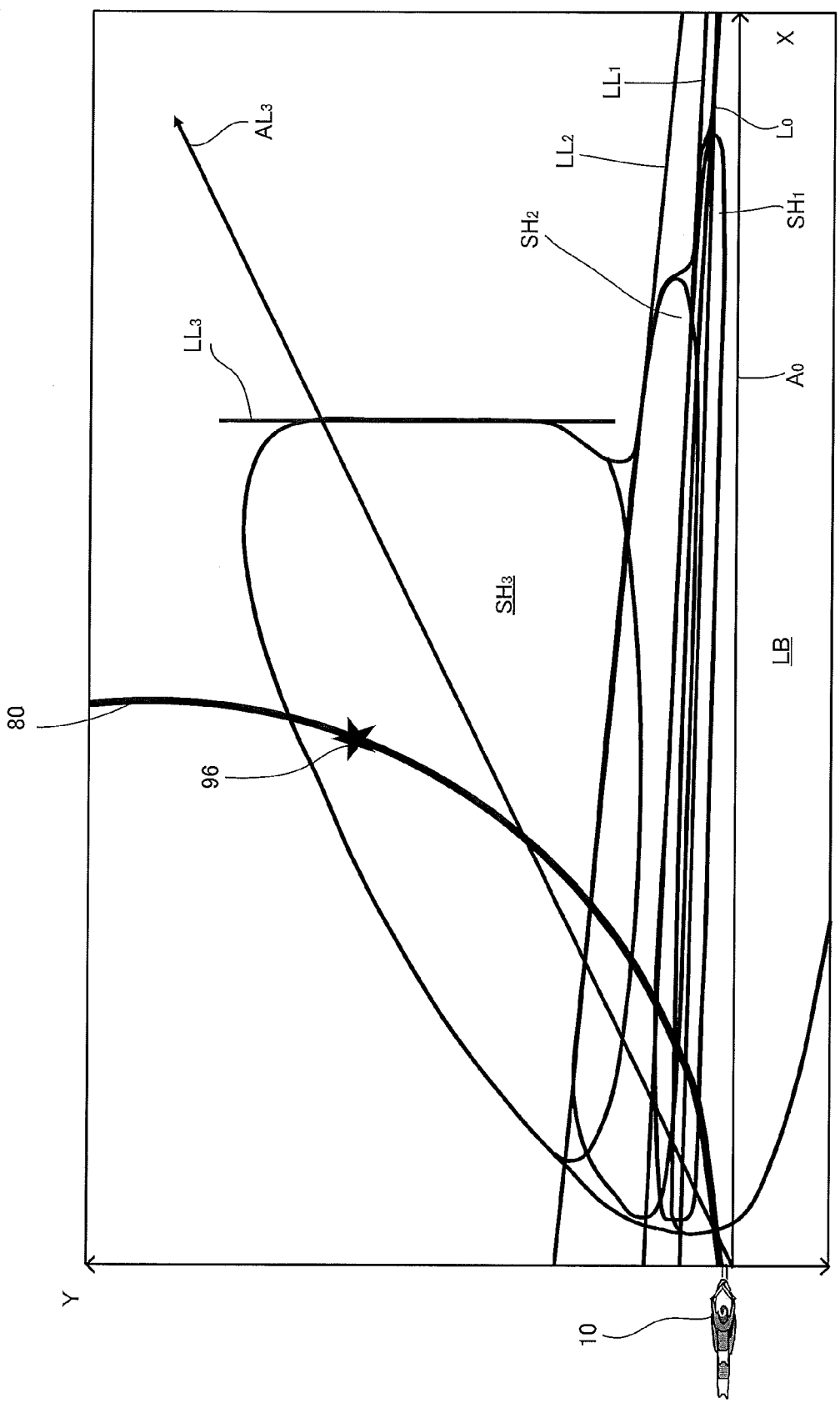
FIG. 15 is a plan view schematically showing an illumination range of a headlight having the illuminance $L_1$ in a case where a vehicle moves through a curve having a radius $R_2$ at the speed $V_4$.

Next, with reference to FIGS. 13 to 15, a description will be given of the illumination ranges of the low beam light source 11L (main headlight 11) and the sub headlight light sources 13La to 13Lc in a case where the motorcycle 10 moves through the curves 81, 82, and 83 having the different radii $R_4$, $R_3$, and $R_2$ at the speed $V_4$. In FIGS. 13 to 15, the motorcycle 10 moves through the curves having the different radii $R_4$, $R_3$, and $R_2$ at the same vehicle speed $V_4$, while in FIGS. 10 to 12, the motorcycle 10 moves on the same curve $R_1$ at the different vehicle speeds $V_1$, $V_2$, and $V_3$. Except for this point, contents of FIGS. 13 to 15 are the same as contents of FIGS. 10 to 12. Therefore, in FIGS. 13 to 15, the same configurations as the configurations shown in FIGS. 10 to 12 are denoted by the same reference numerals. In the following, differences of FIGS. 13 to 15 from FIGS. 10 to 12 will be mainly described, and a description of the points common to FIGS. 10 to 12 and FIGS. 13 to 15 will be omitted. The radii $R_4$, $R_3$, and $R_2$ satisfy the relationship of $R_4 > R_3 > R_2$. The lean angle of the motorcycle 10 when the motorcycle 10 moves through curves having the different radii $R_4$, $R_3$, and $R_2$ at the speed $V_4$ are P1, P2, and P3 (P1<P2<P3), respectively.

FIG. 13 is a plan view schematically showing the illumination range of the headlight having the illuminance $L_1$ in a case where the motorcycle 10 moves through the curve 81 having the radius $R_4$ at the speed $V_4$.

In a situation shown in FIG. 13, the position or area 96 that the rider desires to see is not covered by the illumination range LB of the low beam light source 11L having the illuminance $L_1$. However, the sub headlight light source 13La produces illumination along the optical axis $AL_1$, so that the illumination range $SH_1$ of the sub headlight light source 13La having the illuminance $L_1$ covers the position or area 96 that the rider desires to see. Accordingly, the brightness of the rider's field of view is ensured.

FIG. 14 is a plan view schematically showing the illumination range of the headlight having the illuminance $L_1$ in a case where the motorcycle 10 moves through the curve 82 having the radius $R_3$ at the speed $V_4$.

In a situation shown in FIG. 14, the position or area 96 that the rider desires to see is not covered by the illumination range $SH_1$ of the sub headlight light source 13La having the illuminance $L_1$. However, the sub headlight light source 13Lb produces illumination along the optical axis $AL_2$, so that the illumination range $SH_2$ of the sub headlight light source 13Lb having the illuminance $L_1$ covers the position or area 96 that the rider desires to see. Accordingly, the brightness of the rider's field of view is ensured.

FIG. 15 is a plan view schematically showing the illumination range of the headlight having the illuminance $L_1$ in a case where the motorcycle 10 moves through the curve 83 having the radius $R_2$ at the speed $V_4$.

In FIG. 15, the position or area 96 that the rider desires to see is not covered by the illumination range $SH_2$ of the sub headlight light source 13Lb having the illuminance $L_1$. However, the sub headlight light source 13Lc produces illumination along the optical axis $AL_3$, so that the illumination range $SH_3$ of the sub headlight light source 13Lc having the illuminance $L_1$ covers the position or area 96 that the rider desires to see. Accordingly, the brightness of the rider's field of view is ensured.

In this preferred embodiment, the reference values $K_1$ to $K_3$ preferably increase in the order of the reference values $K_1$ to $K_3$, and a greater reference value $K_1$ to $K_3$ has a smaller interval ($K_1$, $K_2'$, $K_3'$). Accordingly, as shown in FIGS. 13 to 15, even in a case of moving through different curves at the same speed, the sub headlight light sources can be turned on at good timings in accordance with the radii of the curves. As a result, a change in the illumination range of the sub headlight within the rider's field of view is significantly reduced. Additionally, an occurrence of a time period during which the illumination range cannot sufficiently cover the position or area 96 that the rider desires to see is prevented.

Next, the positional relationship between the illumination ranges $SH_1$, $SH_2$, and $SH_3$ of the sub headlight light sources 13La to 13Lc having the illuminance $L_1$ will be described with reference to FIG. 16.

Figure 16:
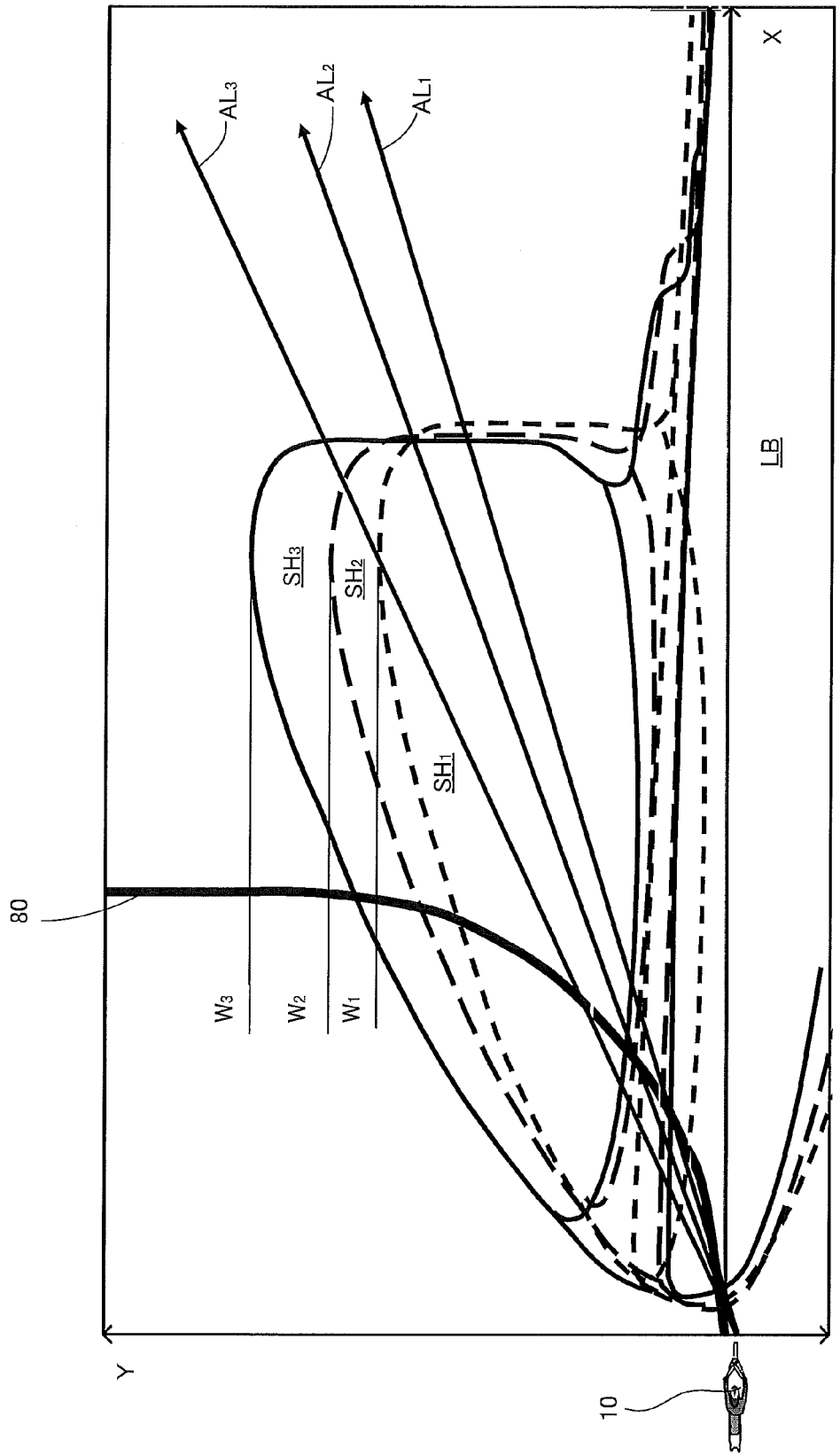
FIG. 16 is a plan view for the comparison among the illumination ranges having the illuminance $L_1$ shown in FIGS. 10 to 12.

FIG. 16 is a plan view for the comparison among the illumination ranges having the illuminance $L_1$ shown in FIGS. 10 to 12.

When the motorcycle 10 is inclined at the lean angle P1, the sub headlight light source 13La produces illumination along the optical axis $AL_1$, to generate the illumination range $SH_1$ (FIG. 10). $W_1$ indicates an outer edge of the illumination range $SH_1$ with respect to the width direction of the vehicle.

When the motorcycle 10 is inclined at the lean angle P2, the sub headlight light source 13Lb produces illumination along the optical axis $AL_2$, to generate the illumination range $SH_2$ (FIG. 11). $W_2$ indicates an outer edge of the illumination range $SH_2$ with respect to the width direction of the vehicle.

When the motorcycle 10 is inclined at the lean angle P3, the sub headlight light source 13Lc produces illumination along the optical axis $AL_3$, to generate the illumination range $SH_3$ (FIG. 12). $W_3$ indicates an outer edge of the illumination range $SH_3$ with respect to the width direction of the vehicle.

In this preferred embodiment, the outer edges $W_1$, $W_2$, and $W_3$ of the illumination ranges $SH_1$, $SH_2$, and $SH_3$ are located increasingly outward in the order of $W_1$, $W_2$, and $W_3$ with respect to the width direction Y of the vehicle. In other words, as the reference values $K_1$ to $K_3$ of the sub headlight light sources 13La to 13Lc are greater, the outer edges $W_1$, $W_2$, and $W_3$ of the illumination ranges $SH_1$, $SH_2$, and $SH_3$ of the sub headlight light sources 13La to 13Lc having the illuminance $L_1$ are located farther outward with respect to the width direction Y of the motorcycle 10 in a plan view (FIG. 16). This makes it easy that the illumination ranges $SH_1$, $SH_2$, and $SH_3$ cover the position or area 96 that the rider desires to see (FIGS. 10 to 12). As a result, a change in the illumination range within the rider's field of view is significantly reduced. Additionally, an occurrence of a time period during which the illumination ranges $SH_1$, $SH_2$, and $SH_3$ cannot sufficiently cover the position or area 96 that the rider desires to see is more reliably prevented.

In FIG. 16, the outer edges $W_1$, $W_2$, and $W_3$ of the illumination ranges $SH_1$, $SH_2$, and $SH_3$ having the illuminance $L_1$ are located farther outward in the order of $W_1$, $W_2$, and $W_3$ with respect to the width direction Y of the vehicle. This positional relationship is, however, established even when the illuminance is not $L_1$.

FIG. 17 is a plan view for the comparison among illumination ranges having an illuminance $L_2$ ($L_2 > L_1$) under the same circumstances as in FIG. 16.

Illumination ranges $SH_1'$, $SH_2'$, and $SH_3'$ are generated by the sub headlight light sources 13La, 13Lb, and 13Lc, respectively, and located inside the illumination ranges $SH_1$, $SH_2$, and $SH_3$ (FIG. 16), respectively. Outer edges $W_1'$, $W_2'$, and $W_3'$ of the illumination ranges $SH_1'$, $SH_2'$, and $SH_3'$ are located farther outward in the order of $W_1'$, $W_2'$, and $W_3'$ with respect to the width direction Y of the vehicle. In other words, as the reference values $K_1$ to $K_3$ of the sub headlight light sources 13La to 13Lc are greater, the outer edges $W_1'$, $W_2'$, and $W_3'$ of the illumination ranges $SH_1'$, $SH_2'$, and $SH_3'$ of the sub headlight light sources 13La to 13Lc having the illuminance $L_2$ are located farther outward with respect to the width direction Y of the motorcycle 10 in a plan view (FIG. 17). In this manner, even in a case of the illuminance $L_2$, the above-described positional relationship is established.

Figure 18A:
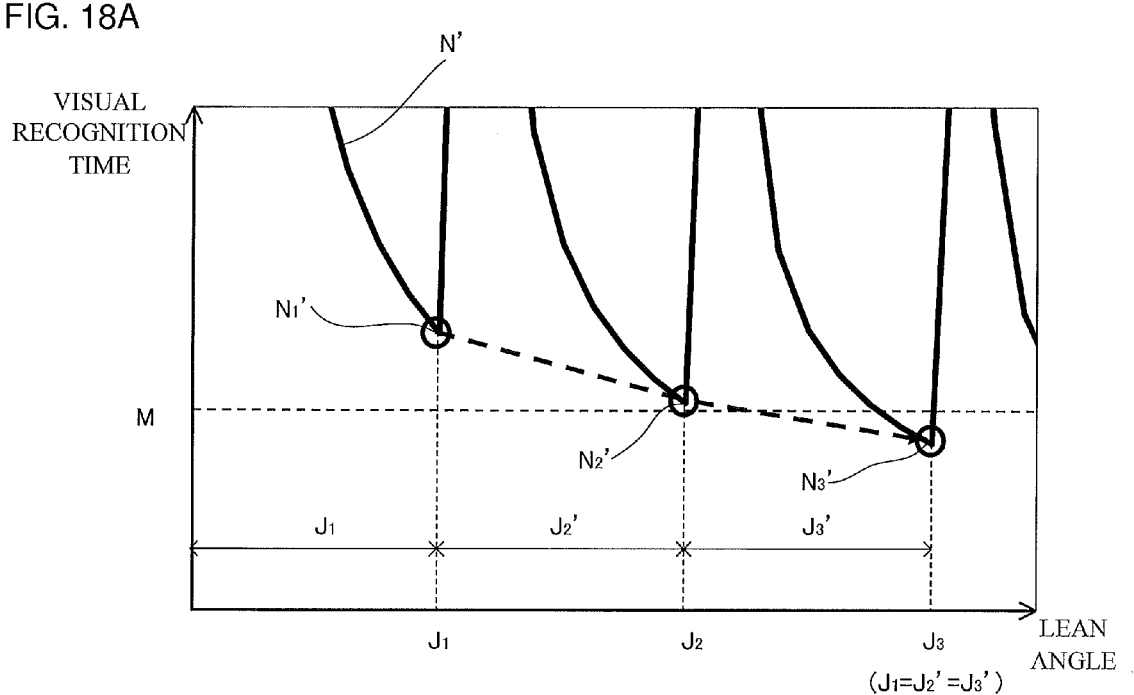
FIG. 18A shows the relationship between a lean angle and a cut-off line visual recognition time in a case where a vehicle not according to the present invention moves through a curve.
Figure 18B:
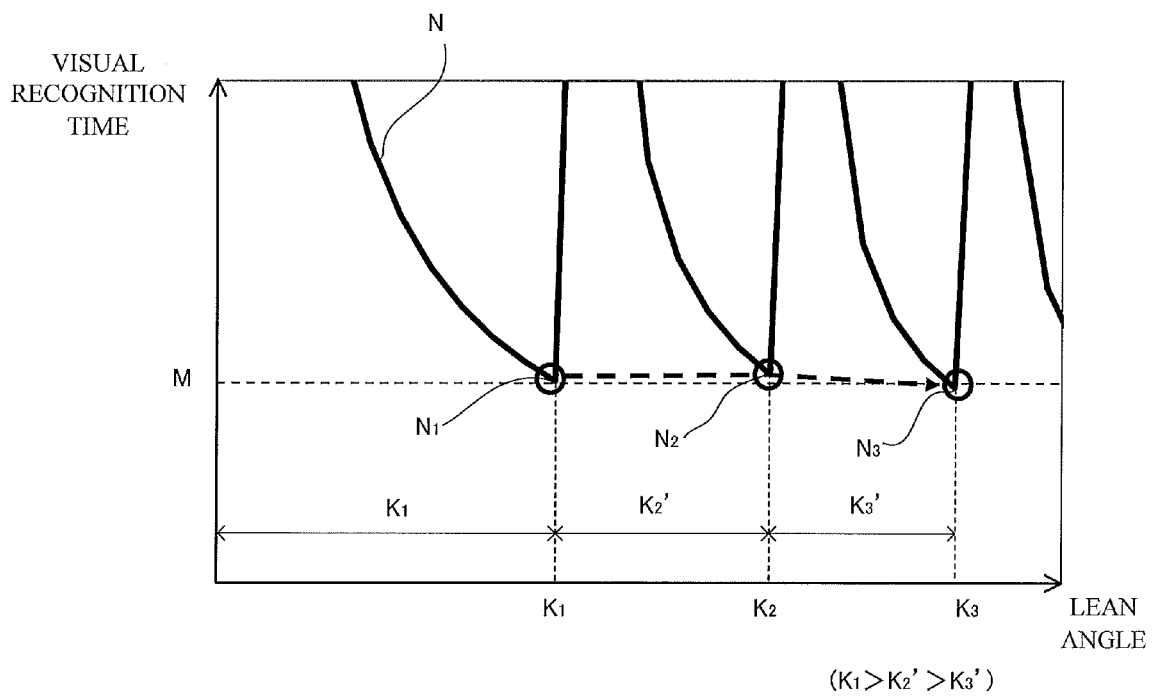
FIG. 18B shows the relationship between a lean angle and a cut-off line visual recognition time in a case where a vehicle according to a preferred embodiment of the present invention moves through a curve.

FIG. 18A shows the relationship between the lean angle and a cut-off line visual recognition time N' in a case where a vehicle not according to the present invention moves through a curve, and FIG. 18B shows the relationship between the lean angle and a cut-off line visual recognition time N in a case where a vehicle (motorcycle 10) according to a preferred embodiment of the present invention moves through a curve while turning to the left. The cut-off line visual recognition time N, N', referred to herein, indicates the value obtained by dividing, by the vehicle speed, a distance from the vehicle to the cut-off line on the path. For example, when the cut-off line visual recognition time is M seconds, it indicates that M seconds are required for the vehicle to reach the position N, N' of the cut-off line, in other words, indicates that the illumination range is currently extending up to the position where the vehicle will reach M seconds later.

The vehicle (vehicle not according to the present invention) shown in FIG. 18A and the vehicle (motorcycle 10) shown in FIG. 18B have the same configuration except for the reference value. More specifically, in the vehicle shown in FIG. 18A, reference values $J_1$, $J_2$, and $J_3$ satisfy the relationship of $J_1 < J_2 < J_3$, and intervals $J_1$, $J_2'$ and $J_3'$ between 0° and $J_1$, between $J_1$ and $J_2$, and between $J_2$ and $J_3$, respectively, satisfy the relationship of $J_1 = J_2' = J_3'$.

Firstly, a description will be given of a case where the lean angle gradually increases from 0° in FIG. 18A. As the lean angle increases from 0°, the cut-off line of the low beam light source approaches to the vehicle on the path, and accordingly the illumination range decreases. As a result, the cut-off line visual recognition time N' is reduced. When the lean angle reaches $J_1$, a first sub headlight is turned on. Consequently, the cut-off line of the first sub headlight light source is generated at a location farther from the cut-off line of the low beam light source. Therefore, the cut-off line visual recognition time N' increases from $N_1'$. The cut-off line visual recognition time $N_1'$ is longer than M.

Then, as the lean angle increases from $J_1$, the cut-off line visual recognition time N' decreases again. When the lean angle reaches $J_2$, a second sub headlight is turned on. Consequently, the cut-off line of the second sub headlight light source is generated at a location farther from the cut-off line of the first sub headlight light source. Therefore, the cut-off line visual recognition time N' increases from $N_2'$. The cut-off line visual recognition time $N_2'$ is longer than M.

Then, as the lean angle increases from $J_2$, the cut-off line visual recognition time N' decreases again. Before the lean angle reaches $J_3$, the cut-off line visual recognition time N' falls below M. Then, when the lean angle reaches $J_3$, a third sub headlight is turned on. Consequently, the cut-off line of the third sub headlight light source is generated at a location farther from the cut-off line of the second sub headlight light source. Therefore, the cut-off line visual recognition time N' increases from $N_2'$, and then exceeds M.

Thus, in an example shown in FIG. 18A, a time period during which the cut-off line visual recognition time N' is less than M occurs. In this time period, the illumination range does not extend up to the position where the vehicle will reach M seconds later.

Next, a description will be given of a case where the lean angle of the motorcycle 10 gradually increases from 0° in FIG. 18(b). As the lean angle of the motorcycle 10 increases from 0°, the cut-off line $L_0$ of the low beam light source 11L approaches to the motorcycle 10 on the path, and accordingly the illumination range LB decreases. As a result, the cut-off line visual recognition time N is reduced. When the lean angle reaches $K_1$, the sub headlight light source 13La is turned on. Consequently, the cut-off line $LL_1$ of the sub headlight light source 13La is generated at a location farther from the cut-off line $L_0$ of the low beam light source 11L (see FIG. 10 and FIG. 13). Therefore, the cut-off line visual recognition time N increases from $N_1$. The cut-off line visual recognition time $N_1$ is longer than M.

Then, as the lean angle increases from $K_1$, the cut-off line visual recognition time N decreases again. When the lean angle reaches $K_2$, the sub headlight light source 11Lb is turned on. Consequently, the cut-off line $LL_2$ of the sub headlight light source 11Lb is generated at a location farther from the cut-off line $LL_1$ of the sub headlight light source 11La (see FIG. 11 and FIG. 14). Therefore, the cut-off line visual recognition time N increases from $N_2$. The cut-off line visual recognition time $N_2$ is longer than M.

Then, as the lean angle increases from $K_2$, the cut-off line visual recognition time N decreases again. However, before the cut-off line visual recognition time N falls below M, the lean angle reaches $K_3$, so that the sub headlight light source 11Lc is turned on. Consequently, the cut-off line $LL_3$ of the sub headlight light source 11Lc is generated at a location farther from the cut-off line $LL_2$ of the sub headlight light source 11Lb (see FIG. 12 and FIG. 15). Therefore, the cut-off line visual recognition time N increases from $N_3$. The cut-off line visual recognition time $N_3$ is longer than M.

Thus, in an example shown in FIG. 18B, a time period during which the cut-off line visual recognition time N is less than M does not occur. Accordingly, in the motorcycle 10, until the lean angle increases from 0° and reaches $K_3$, the illumination range always extends up to the position where the motorcycle 10 will reach M seconds later.

As described above, in the motorcycle 10 according to the present preferred embodiment, the reference values $K_1$ to $K_3$ increase in the order of the reference values $K_1$ to $K_3$, and a greater reference value $K_1$ to $K_3$ has a smaller interval ($K_1$, $K_2'$, $K_3'$). Accordingly, the sub headlight light sources can be sequentially turned on at good timings. Thus, an occurrence of a time period during which the illumination range cannot sufficiently cover the position or area that the rider desires to see is prevented.

Differences among the cut-off line visual recognition times $N_1$, $N_2$, and $N_3$ in FIG. 18B are smaller than differences among the cut-off line visual recognition times $N_1'$, $N_2'$, and $N_3'$ in FIG. 18A. In this manner, in the motorcycle 10 according to the present preferred embodiment, the reference values $K_1$ to $K_3$ increase in the order of the reference values $K_1$ to $K_3$, and a greater reference value $K_1$ to $K_3$ has a smaller interval ($K_1$, $K_2'$, $K_3'$). Thus, differences among the cut-off line visual recognition times $N_1$, $N_2$, and $N_3$ are made small. Accordingly, a change in the illumination range within the rider's field of view is reduced.

In preferred embodiments of the present invention, as described above, a greater reference value ($K_1$ to $K_3$) has a smaller interval ($K_1$, $K_2'$, $K_3'$). Therefore, as compared with a case of regular intervals, differences among lower limit values ($N_1$, $N_2$, $N_3$) of the respective cut-off line visual recognition times are smaller.

An advantage of reducing the differences among the lower limit values ($N_1$, $N_2$, $N_3$) of the cut-off line visual recognition times is as follows. For example, at a time of running on a curve having the same radius, as the lean angle increases, the speed increases so that the vehicle can reach a longer distance in the same time period. At this time, the rider normally places his/her viewing point to a position farther from the vehicle. This is because the rider can more easily drive the vehicle if a time taken until the vehicle reaches the position of the rider's viewing point (visual recognition object) is kept constant. Therefore, if the differences among the lower limit values ($N_1, N_2, N_3$) of the cut-off line visual recognition times before and after the respective sub headlight light sources are turned on is reduced, a variation in a manner of movement among the respective cut-off lines within the rider's field of view is reduced. As a result, a change in the illumination range within the rider's field of view is reduced.

In short, in various preferred embodiments of the present invention, a greater reference value ($K_1$ to $K_3$) preferably has a smaller interval ($K_1, K_2', K_3'$), and this reduces a variation in the manner of movement among the respective cut-off lines as compared with a case of regular intervals. As a result, an effect is exerted that a change in the illumination range within the rider's field of view is reduced. Accordingly, in various preferred embodiments of the present invention, any appropriate reference value ($K_1$ to $K_3$) may preferably be set as long as the relationship in which a greater reference value ($K_1$ to $K_3$) has a smaller interval ($K_1, K_2', K_3'$) is satisfied.

In the present preferred embodiment, the intervals $K_1, K_2', K_3'$ preferably satisfy the relationship of $K_1 > K_2' > K_3'$. Moreover, in a preferred embodiment of the present invention, it is preferable that a difference between neighboring intervals ($K_1$ and $K_2'$, and $K_2'$ and $K_3'$) among the plurality of intervals ($K_1, K_2', K_3'$) is about 0.5° or more ($K_1 - K_2' \geq 0.5°$, and $K_2' - K_3' \geq 0.5°$). It is also preferable that a larger one of the neighboring intervals is equal to or more than about 1.1 times than a smaller one of the neighboring intervals ($K_1 \geq 1.1 \times K_2'$, and $K_2' \geq 1.1 \times K_3'$). These relationships are applicable to a case where the number of sub headlight light sources that illuminate one side of the vehicle with respect to the width direction of the vehicle is two or more. However, it is preferable that these relationships are applied to a case where the number of the sub headlight light sources is three, for example.

In the motorcycle 10 according to the present preferred embodiment, the sub headlight 13 preferably includes the sub headlight units 13L and 13R, each of which is provided at each side with respect to the width direction of the vehicle, for example. However, the present invention is not limited to this example. For example, in a possible configuration, the sub headlight units 13L and 13R each provided at each side with respect to the width direction of the vehicle are preferably integral with each other, as a single sub headlight unit. In this case, the single sub headlight unit preferably includes, at each side thereof with respect to the width direction of the vehicle, a plurality of headlight light sources that generate illumination ranges at one side with respect to the width direction of the vehicle.

The present preferred embodiment describes a case where each of the sub headlight units 13L and 13R preferably is a physically integrated unit. However, the present invention is not limited to this example. It may be possible that the sub headlight unit 13L is physically divided into the sub headlight light sources 13La to 13Lc. In this case, it may be possible that these sub headlight light sources 13La to 13Lc are assembled into a single sub headlight unit 13L which is then installed in the motorcycle 10 (vehicle), for example. It may be also possible that each of the sub headlight light sources 13La to 13Lc is individually installed in the motorcycle 10, for example. In this case, the sub headlight light sources 13La to 13Lc, in a state of being installed in the motorcycle 10, constitute a single sub headlight unit 13L.

In the present preferred embodiment, the sub headlight units 13L and 13R preferably are members separate from the main headlight 11, for example. However, the present invention is not limited to this example. It may be acceptable that a sub headlight unit is integrated with a main headlight. In this case, the sub headlight unit includes the main headlight.

The attitude detection sensor 22 and the vehicle speed sensor 23 correspond to a detector arranged to detect variables available to obtain the lean angle of the motorcycle 10. Although the detector preferably includes the attitude detection sensor 22 and the vehicle speed sensor 23 in the present preferred embodiment, the present invention is not limited to this example. For example, the detector may preferably include the attitude detection sensor 22 while not including the vehicle speed sensor 23. The controller 20 corresponds to a control unit of the present invention. However, a hardware configuration of the present invention is not limited to this example. The controller or control unit is programmed to determine whether or not the lean angle of the motorcycle 10 has reached the reference value based on the variables detected by the detector. At this time, it is not always necessary that the controller or control unit calculates the lean angle. No particular limitation is put on details of processing performed in the controller or control unit. For example, it may be possible that a memory provided in the controller 20 serving as the control unit stores, in the form of data, a table in which the angular velocity (roll rate) and the vehicle speed are associated with a result of whether or not the lean angle has reached a first reference value. In this case, the controller or control unit preferably refers to the table based on the angular velocity and the vehicle speed, and thereby can determine whether or not the lean angle has reached the first reference value without calculating the lean angle.

In the present preferred embodiment, the lean angle preferably is the angle of inclination of the vehicle body to the inner side of a curve relative to the upright state (vertical direction), for example. However, the present invention is not limited to this example. The lean angle may be the angle of inclination of the vehicle body to the inner side of a curve relative to a direction perpendicular to a road surface, for example. As a method and a device that measures the angle of inclination of the vehicle body to the inner side of a curve relative to the direction perpendicular to the road surface, conventionally known ones are adoptable.

The present preferred embodiment describes a case where the sub headlight units 13L and 13R preferably are members separate from the control unit (controller 20) and the detector (the attitude detection sensor 22 and the vehicle speed sensor 23), for example. However, the present invention is not limited to this example. The sub headlight unit may include at least one of the control unit, the communication unit, and the detector, for example.

In the present preferred embodiment, three sub headlight light sources preferably are provided at each side of the vehicle with respect to the width direction of the vehicle, for example. In the present invention, however, it suffices that the number of sub headlight light sources that illuminate one side of the vehicle with respect to the width direction of the vehicle is at least two, for example. Additionally, in the present invention, it suffices that the vehicle includes a plurality of sub headlight light sources that illuminate the left side with respect to the width direction of the vehicle and a plurality of sub headlight light sources that illuminate the right side with respect to the width direction of the vehicle, for example. It is not always necessary that the sub headlight light sources are provided at each side of the vehicle with respect to the width direction of the vehicle. It is preferable that the number of sub headlight light sources that illuminate one side of the vehicle with respect to the width direction of the vehicle is at least three, for example.

In the present preferred embodiment, one sub headlight light source preferably is constituted of one light source, and one reference value preferably is set for this one light source, for example. However, in the present invention, the number of light sources that constitute one sub headlight light source is not particularly limited. For example, it may be acceptable that one sub headlight light source is constituted of a plurality of light sources and one reference value is set for the plurality of light sources.

The present preferred embodiment describes a case where the reference value used when the lean angle increases so that the brightness of the sub headlight light source increases preferably is the same as the reference value used when the lean angle decreases so that the brightness of the sub headlight light source decreases, for example. Instead, these reference values may be different from each other. To be specific, it may be possible that a reference value used when the brightness increases and a reference value used when the brightness decreases are set for one sub headlight light source. In such a case, the reference value used when the brightness increases can be set greater than the reference value used when the brightness decreases, for example, to prevent frequent occurrences of a change in the brightness, which may otherwise be caused by merely a slight change in the lean angle.

The present preferred embodiment describes a case where the sub headlight light source preferably is turned on in accordance with the lean angle. However, the present invention is not limited to this example. The sub headlight light source may be configured such that a turn-on function in accordance with the lean angle is manually activated or deactivated, for example. To be specific, it may be possible that the function is manually put into a standby state and, in the standby state, the sub headlight light source is turned on in accordance with the lean angle. In this case as well, the sub headlight light source is preferably turned on not manually but in accordance with the lean angle. In the flasher, on the other hand, flashing/turn-off is manually switched. Also, in the main headlight, the illuminating direction preferably is manually switched. In this manner, the sub headlight light source is different from the flasher and the main headlight.

The sub headlight light source may be also configured such that an instruction for turn-on or turn-off is manually inputted, for example. In such a case, when the instruction is not inputted, the brightness of the sub headlight light source is changed in accordance with the lean angle, while when the instruction is inputted, turn-on or turn-off is performed in accordance with the instruction. For example, when the instruction for turn-on is inputted, the sub headlight light source is preferably turned on irrespective of the lean angle, for example. When the instruction for turn-off is inputted, the sub headlight light source is turned off irrespective of the lean angle. In such a case, the sub headlight system includes an input device (for example, a switch) to which the instruction to turn on or off the sub headlight light source is manually inputted. When the instruction is inputted, the control unit turns on or off the sub headlight light source in accordance with the instruction. When the instruction is not inputted, the control unit changes the brightness of the sub headlight light source in accordance with the lean angle. In this case as well, the sub headlight light source is different from the flasher and the main headlight, in that a function of turning on the sub headlight light source in accordance with the lean angle is provided.

The sub headlight light source may be configured such that, when the lean angle is equal to or larger than a minimum reference value, the brightness is changed in accordance with the lean angle, while when the lean angle is less than the minimum reference value (for example, at a time of running straight ahead), the brightness is manually changed, for example. In this case as well, the sub headlight light source is different from the flasher and the main headlight, in that a function of turning on the sub headlight light source in accordance with the lean angle is provided.

In a preferred embodiment of the present invention, turn-on of the sub headlight light source preferably includes turn-on in a full light state and turn-on in a dimmed state. No particular limitation is put on a method for dimming the sub headlight light source. The sub headlight light source configured of an LED, for example, can be turned on in a dimmed state via dimming control using a pulse width modulation control (PWM control), for example.

In the description of the present preferred embodiment, the sub headlight light source preferably is turned on in accordance with the lean angle. Here, the sub headlight light source is turned on in accordance with the lean angle because the sub headlight light source functions mainly as a light that ensures the field of view of the rider of the vehicle. Therefore, in a well-lit situation, for example, in daytime, the sub headlight light source may not necessarily be turned on in accordance with the lean angle.

The present preferred embodiment describes a case where, as the reference values $K_1$ to $K_3$ of the sub headlight light sources 13La to 13Lc are greater, the outer edges $W_1$, $W_2$, $W_3$ of the illumination ranges $SH_1$, $SH_2$, and $SH_3$ of the sub headlight light sources 13La to 13Lc having the illuminance $L_1$ are located farther outward with respect to the width direction Y of the motorcycle 10 in a plan view, for example. However, the present invention is not limited to this example. In this preferred embodiment, a greater reference value ($K_1$ to $K_3$) preferably has a smaller interval ($K_1$, $K_2'$, $K_3'$), and accordingly a change in the illumination range of the sub headlight within the rider's field of view can be reduced. Moreover, an occurrence of a time period during which the illumination ranges $SH_1$, $SH_2$, and $SH_3$ cannot sufficiently cover the position or area 96 that the rider desires to see is prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sub headlight unit for use in a vehicle that leans into turns, the sub headlight unit comprising:
    a plurality of sub headlight light sources arranged to illuminate, at one side with respect to a width direction of the vehicle, an area ahead and outward of the vehicle with respect to the width direction of the vehicle; wherein
    a brightness of the plurality of sub headlight light sources changes in accordance with a lean angle of the vehicle;
    when the lean angle of the vehicle reaches a reference value that is individually set for each of the plurality of sub headlight light sources, the respective sub headlight light source exhibits a predetermined brightness; and
    the reference values are greater than 0° and different from one another, and the reference values are set to be values sequentially increasing at intervals from 0° such that the interval is smaller as the reference value is greater.

2. The sub headlight unit according to claim 1, wherein as the reference value set for the sub headlight light source is greater, a cut-off line of the sub headlight light source is inclined at a larger inclination angle relative to a horizontal line that is obtained when the vehicle in an upright state is seen from a front side thereof.

3. The sub headlight unit according to claim 2, wherein the inclination angles of the cut-off lines of the respective sub headlight light sources are values sequentially increasing at intervals from 0° such that the interval is smaller as the inclination angle is larger.

4. The sub headlight unit according to claim 1, wherein as the reference value set for the sub headlight light source is greater, an outer edge of an illumination range of the sub headlight light source having a predetermined illuminance is located farther outward with respect to the width direction of the vehicle in a plan view.

5. The sub headlight unit according to claim 1, wherein an optical axis of the sub headlight light source is fixed, and the reference values of the lean angle, each of which is set for each of the plurality of sub headlight light sources whose optical axes are fixed, are values sequentially increasing at intervals from 0° such that the interval is smaller as the reference value is greater.

6. The sub headlight unit according to claim 1, wherein
the plurality of sub headlight light sources are located at the one side of the vehicle with respect to the width direction of the vehicle; and
the reference values of the lean angle, each of which is set for each of the plurality of sub headlight light sources located at the one side, are values sequentially increasing at intervals from 0° such that the interval is smaller as the reference value is greater.

7. The sub headlight unit according to claim 1, wherein as the reference value set for the sub headlight light source is greater, a larger angle is defined in a plan view between an optical axis of the sub headlight light source and a center line of the vehicle in a front-back direction thereof.

8. The sub headlight unit according to claim 1, wherein as the reference value set for the sub headlight light source is greater, an illumination range of the sub headlight light source obtained when the vehicle is in an upright state is located farther upward.

9. A sub headlight system for use in a vehicle that leans into turns, the sub headlight system comprising:
the sub headlight unit according to claim 1;
a controller arranged and programmed to change the brightness of the sub headlight light source in accordance with the lean angle of the vehicle; and
a detector arranged to detect a variable to obtain the lean angle of the vehicle; wherein
when the lean angle of the vehicle reaches a reference value that is individually set for each of the sub headlight light sources, the controller causes the corresponding sub headlight light source to exhibit a predetermined brightness.

10. A vehicle that leans into turns comprising:
the sub headlight system according to claim 9.

* * * * *